United States Patent [19]

Schneider et al.

[11] Patent Number: 5,019,115
[45] Date of Patent: May 28, 1991

[54] METHOD AND APPARATUS FOR PRODUCING FRACTURED CHIPS WHEN PERFORMING A TURNING OPERATION

[75] Inventors: Friedhelm Schneider, Wegberg; Klaus Koepnick, Solingen; Henrik Wowra, Gangelt, all of Fed. Rep. of Germany

[73] Assignee: Firma Wilhelm Hegenscheidt Gesellschaft mbH, Erkelenz, Fed. Rep. of Germany

[21] Appl. No.: 364,692

[22] Filed: Jun. 8, 1989

[30] Foreign Application Priority Data

Jun. 14, 1988 [EP] European Pat. Off. ........ 88109436.1

[51] Int. Cl.$^5$ .......................... B23B 1/00; B23B 5/32; B23B 25/02
[52] U.S. Cl. ........................ 82/1.11; 82/105; 82/904
[58] Field of Search ................ 82/1.11, 104, 105, 133, 82/134, 173, 904

[56] References Cited

U.S. PATENT DOCUMENTS 3,174,404  3/1965  Findley ................................. 82/138
3,918,348  11/1975  Runft ................................... 82/118

FOREIGN PATENT DOCUMENTS 0163800  12/1981  Japan ................................. 82/1.11
0793722  1/1981   U.S.S.R. ............................ 82/1.11
0806260  2/1981   U.S.S.R. ............................ 82/1.11
0818756  4/1981   U.S.S.R. ............................ 82/1.11
1038079  8/1983   U.S.S.R. ............................ 82/1.11
1069957  1/1984   U.S.S.R. ............................ 82/1.11

*Primary Examiner*—William E. Terrell
*Attorney, Agent, or Firm*—W. G. Fasse; D. H. Kane, Jr.

[57] ABSTRACT

The feed advance speed, or rather its scalar value, of a turning cutting tool edge is varied for a time duration which is short relative to the time duration required for one full revolution of a work piece. The varying of the scalar value of the feed advance speed takes place at non-periodic timed intervals and at least once for each work piece revolution. Thus, a simple control not requiring any enforced phase relationship between tool movements during different revolutions of the work piece, can be applied to a computer numerically controlled machine tool, such a lathe for truing railroad wheels. A work piece surface is achieved which has at least the quality of conventional work piece surfaces produced with substantially more complicated phase controls for the tool movement. Positive chip fracture is also achieved.

13 Claims, 19 Drawing Sheets

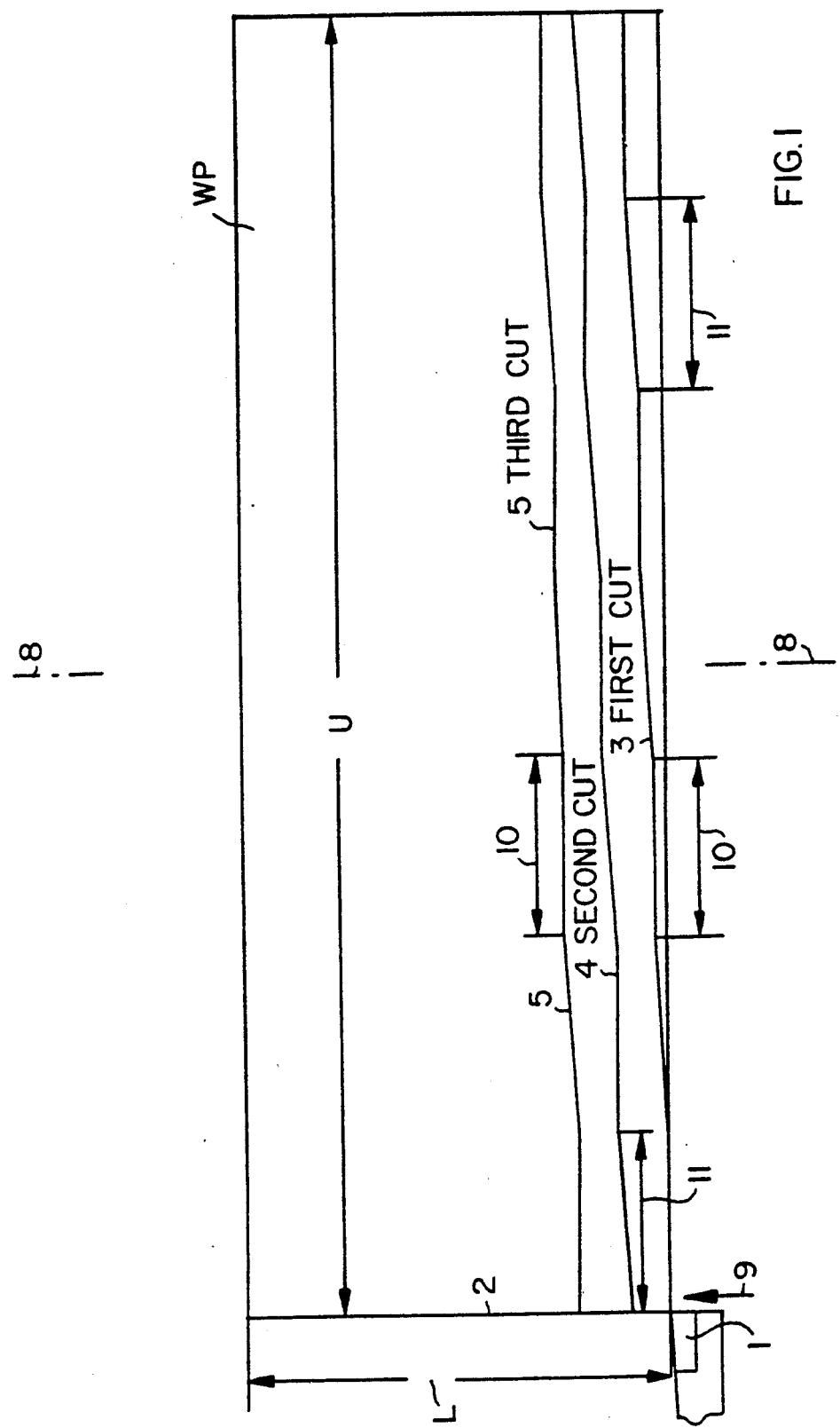

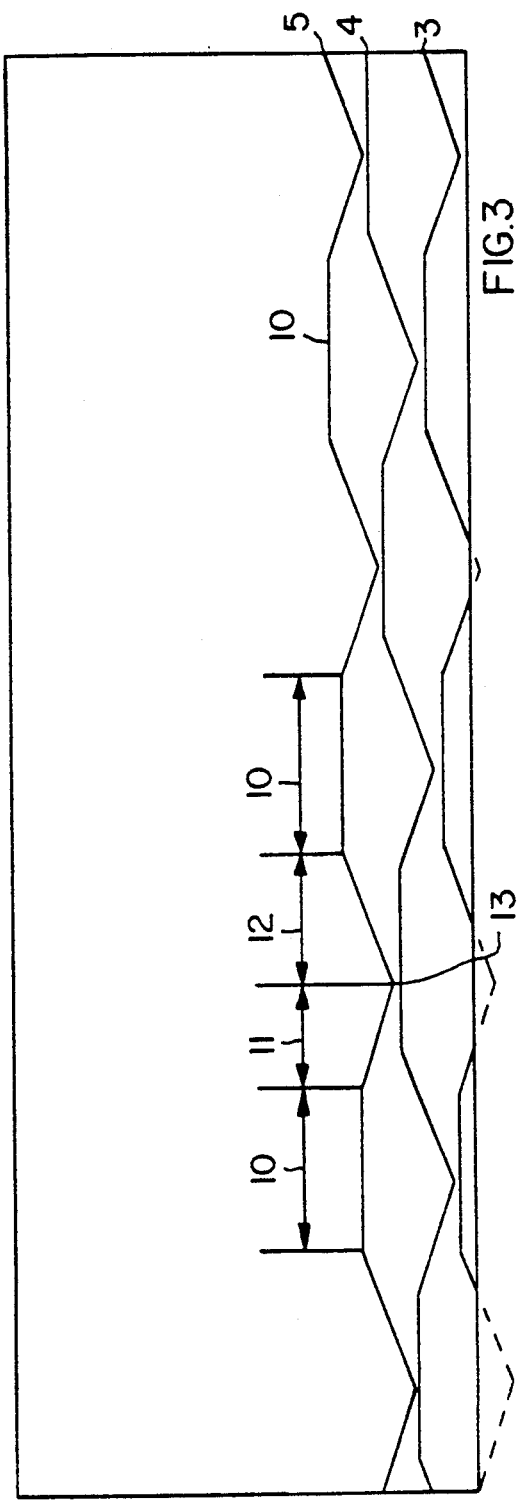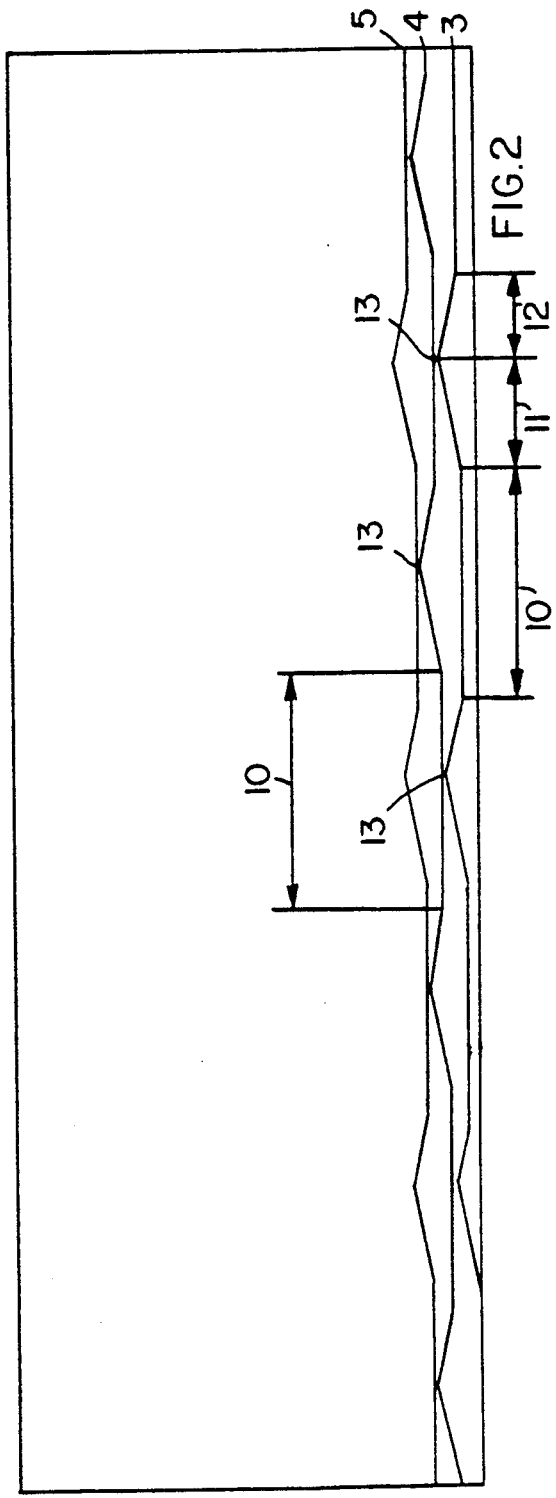

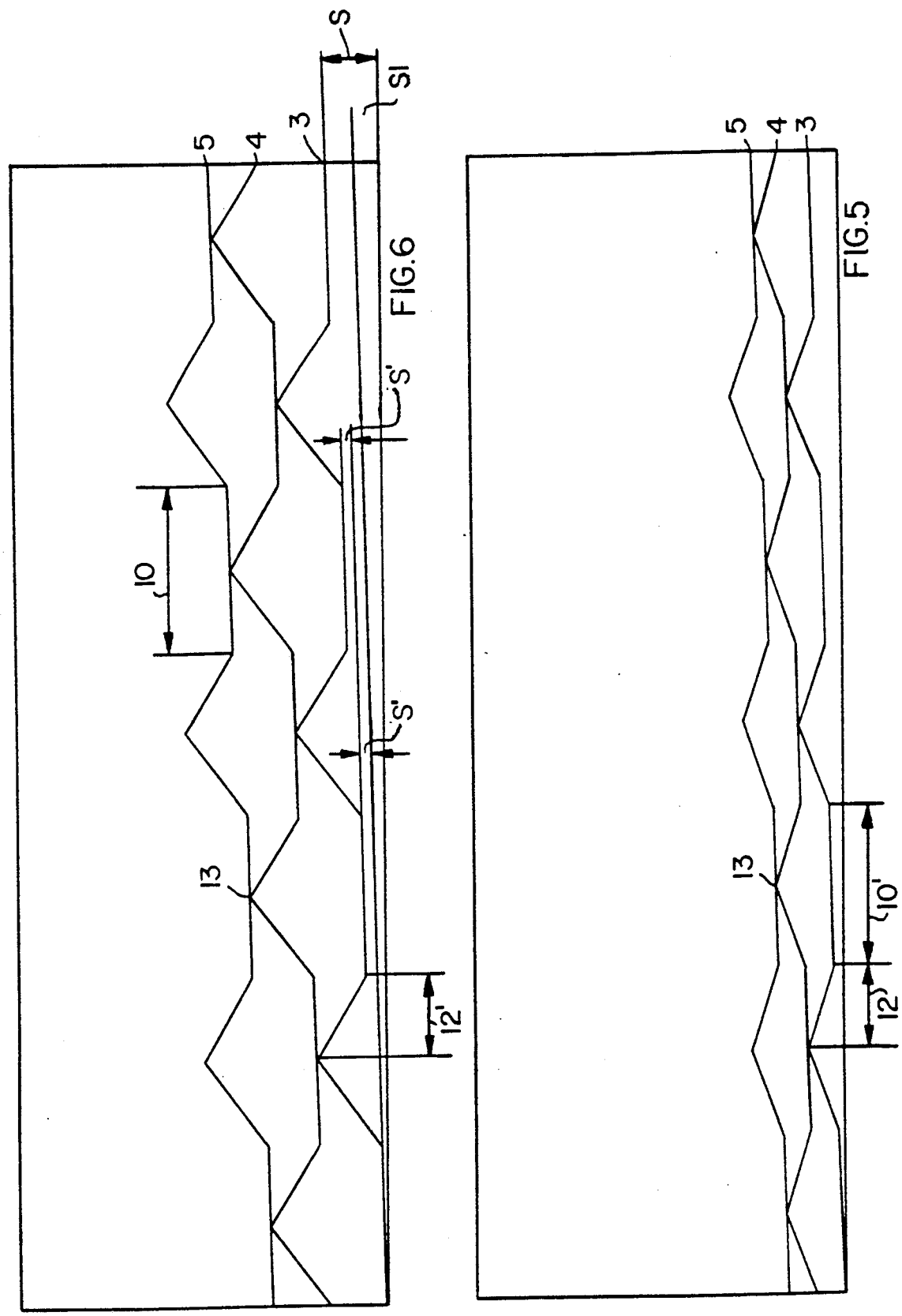

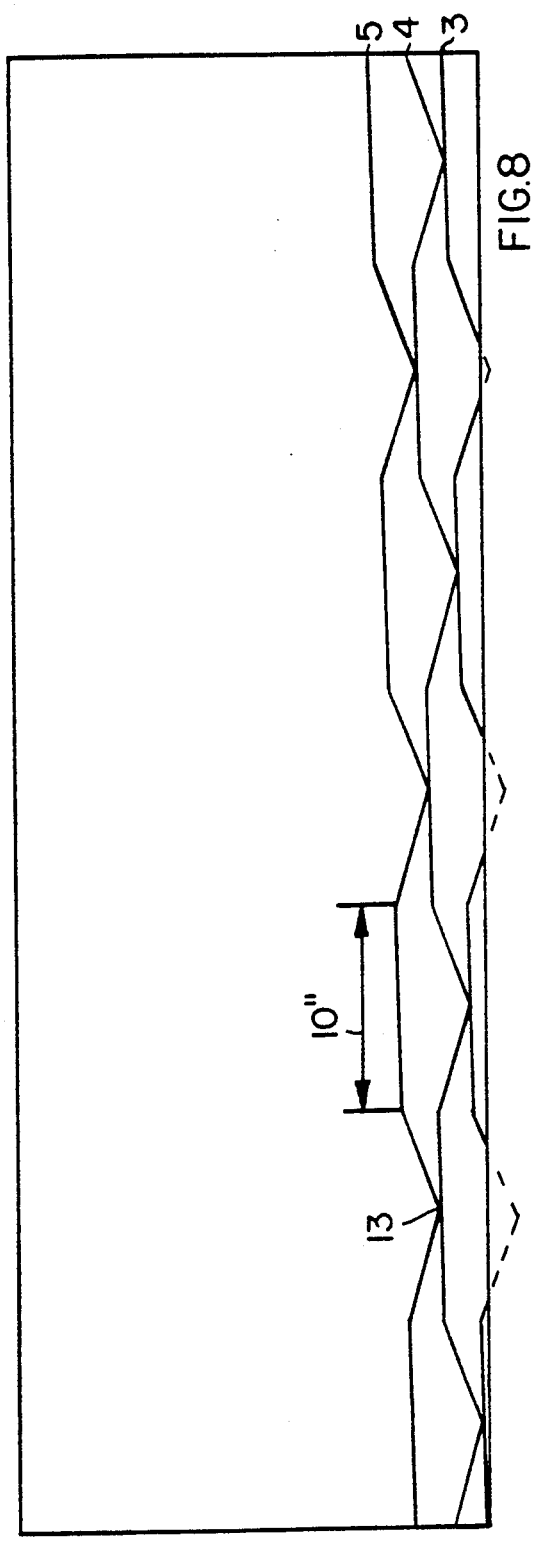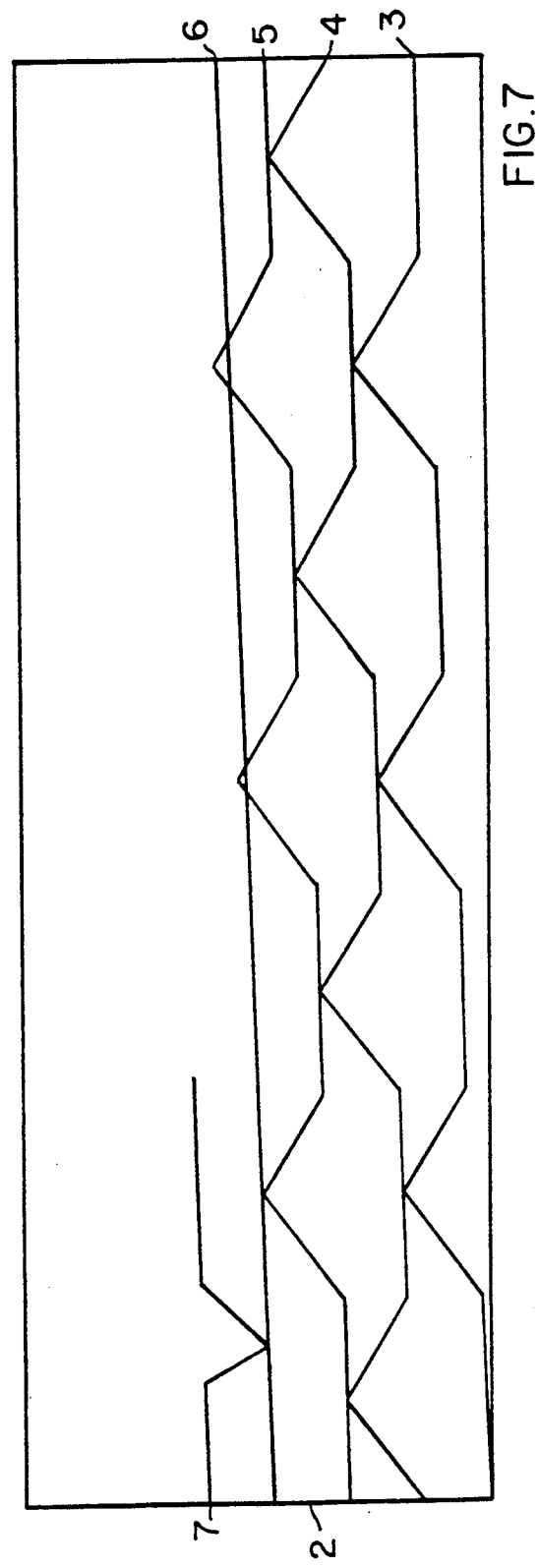

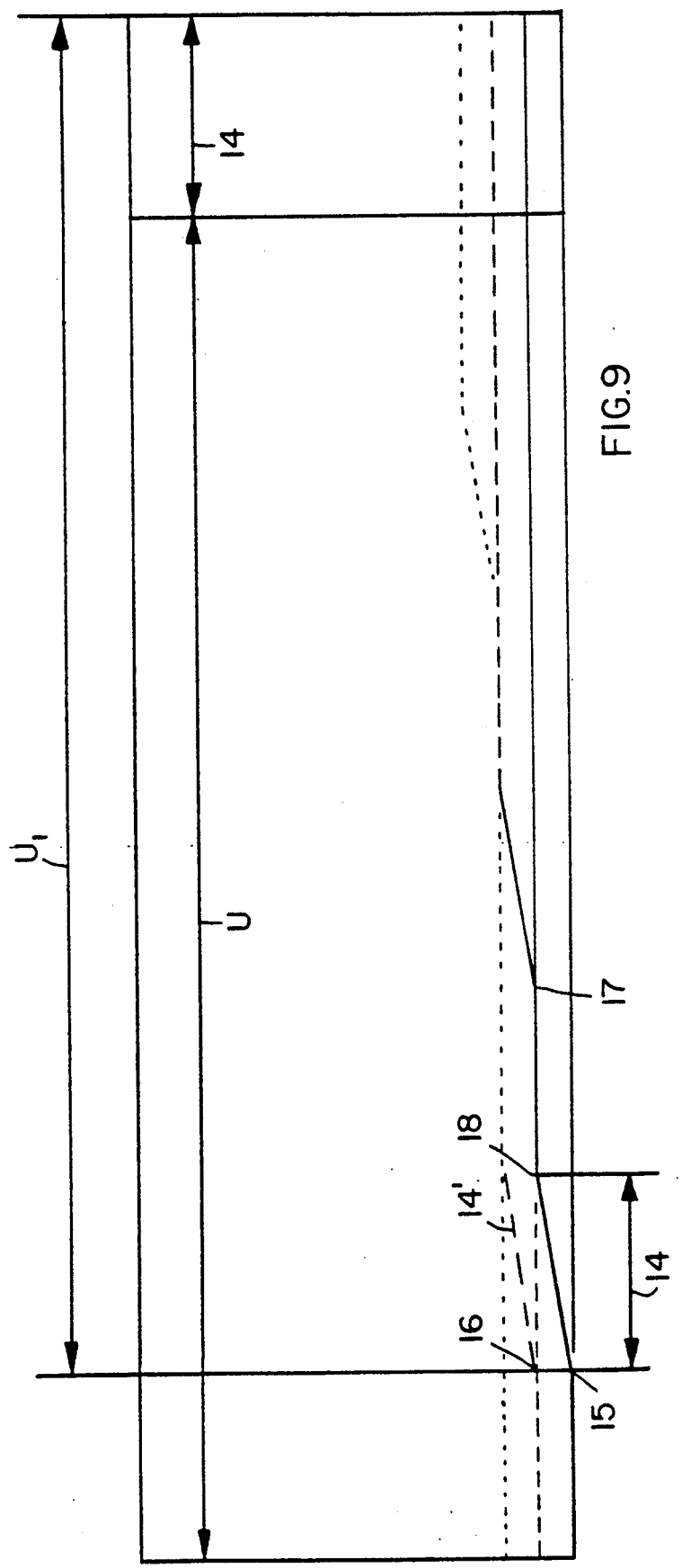

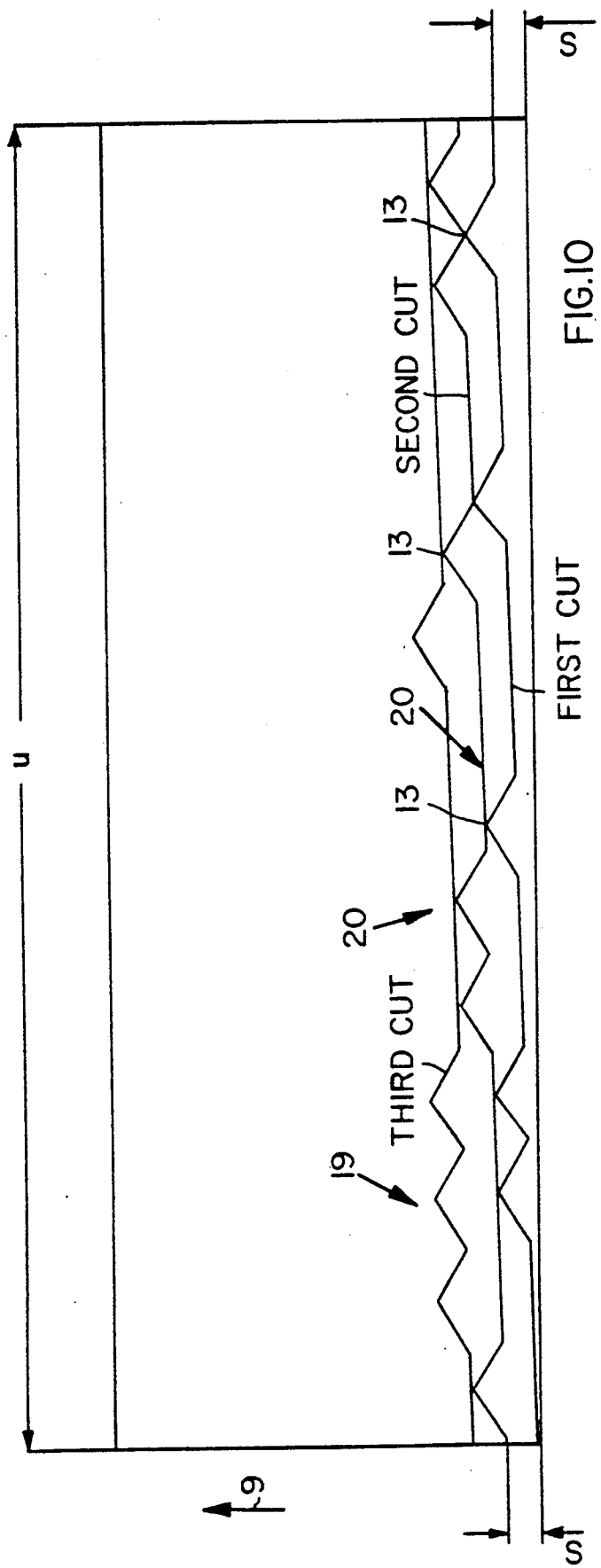

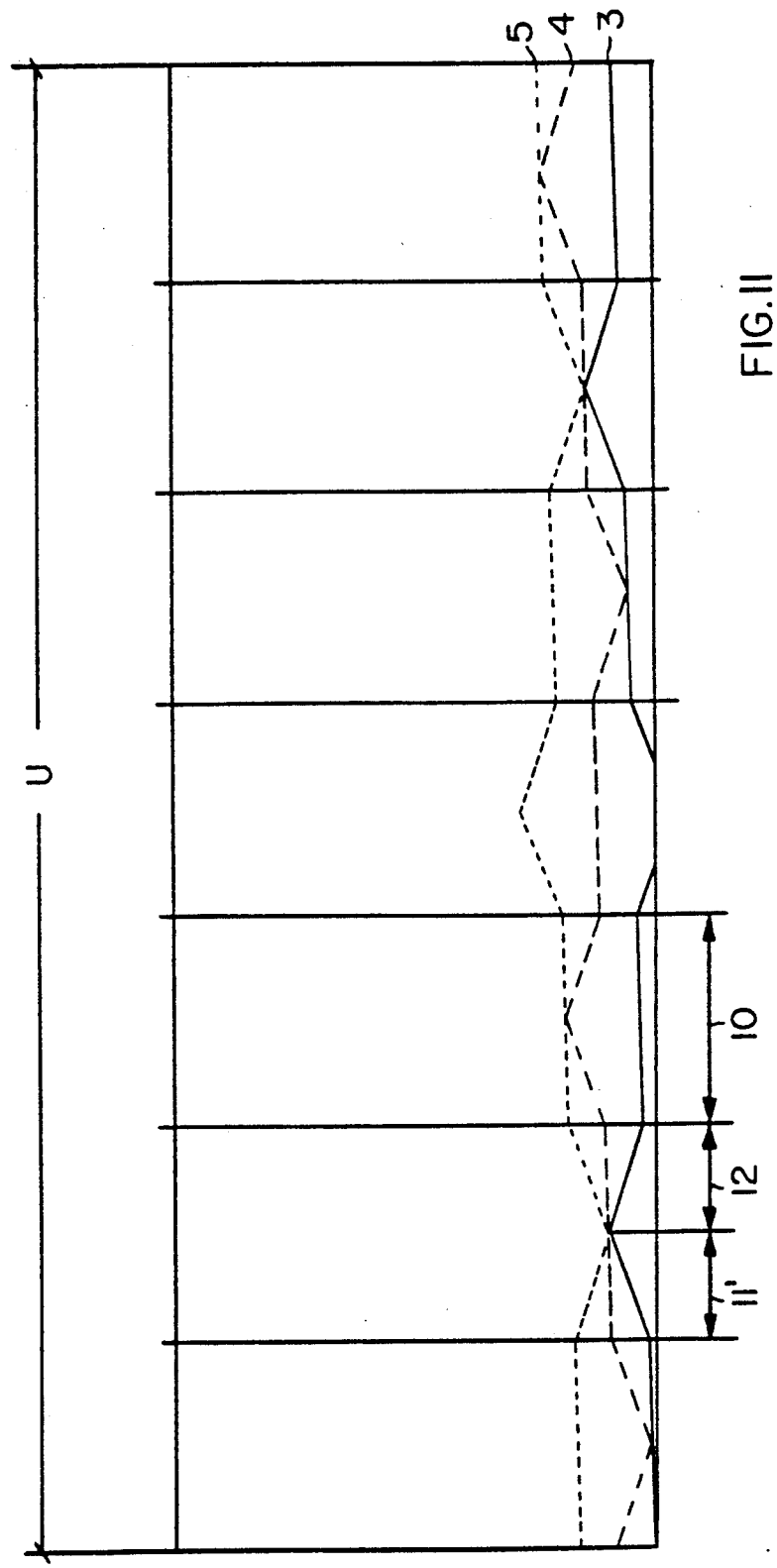

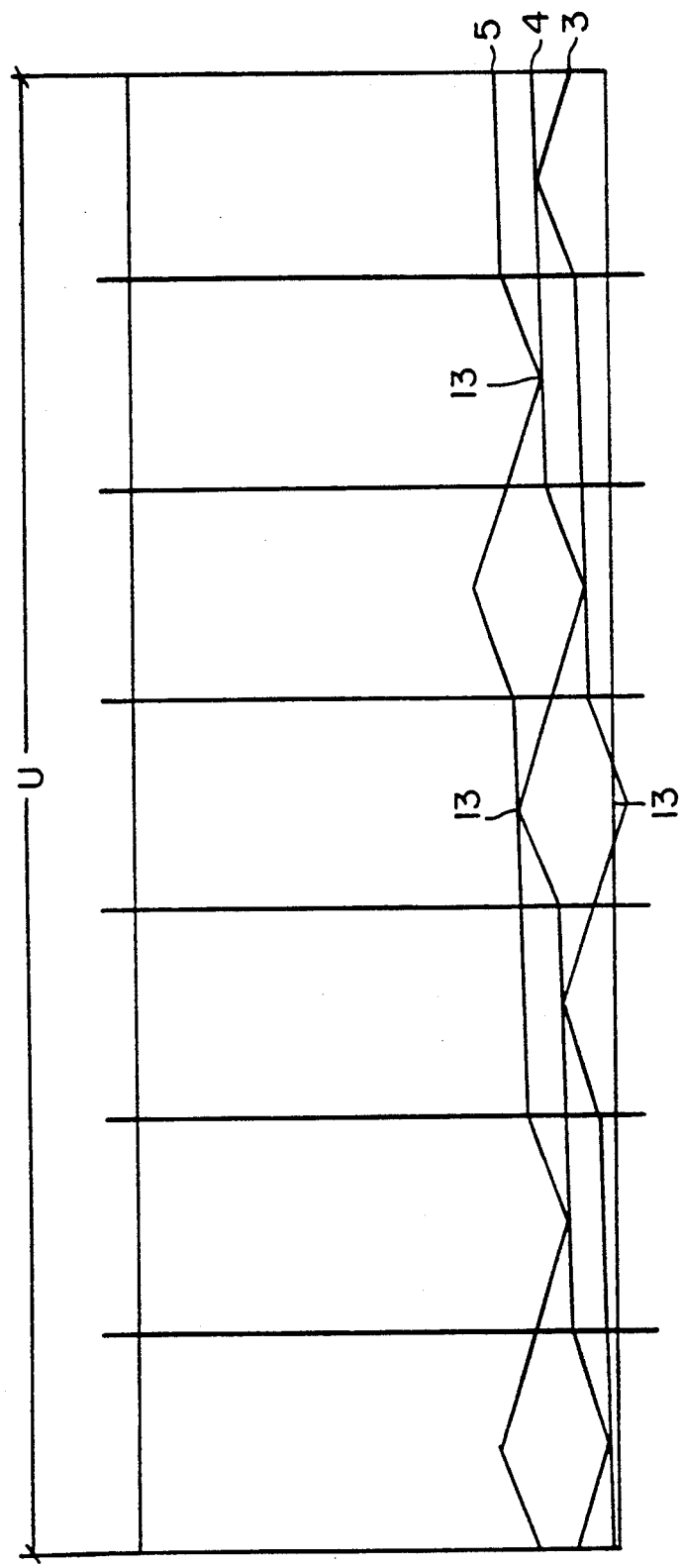

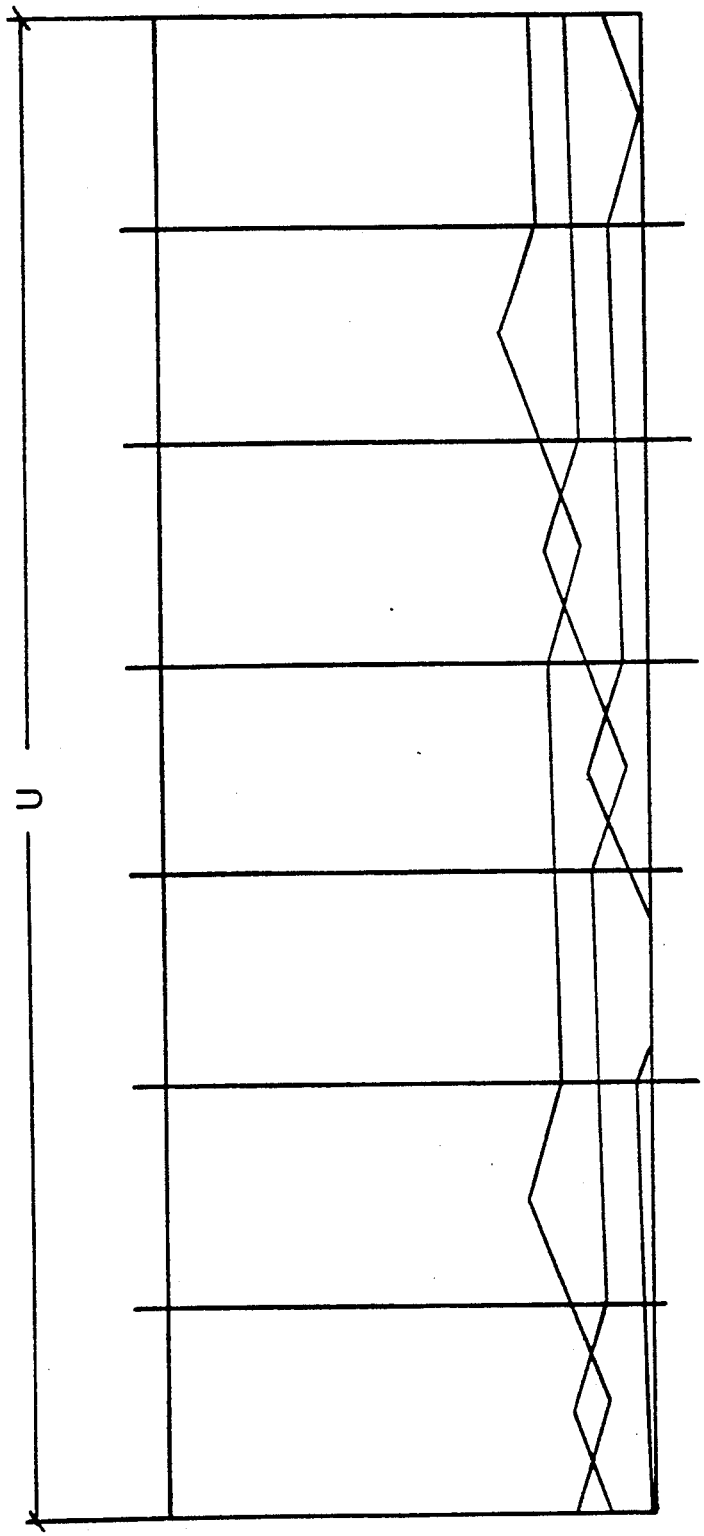

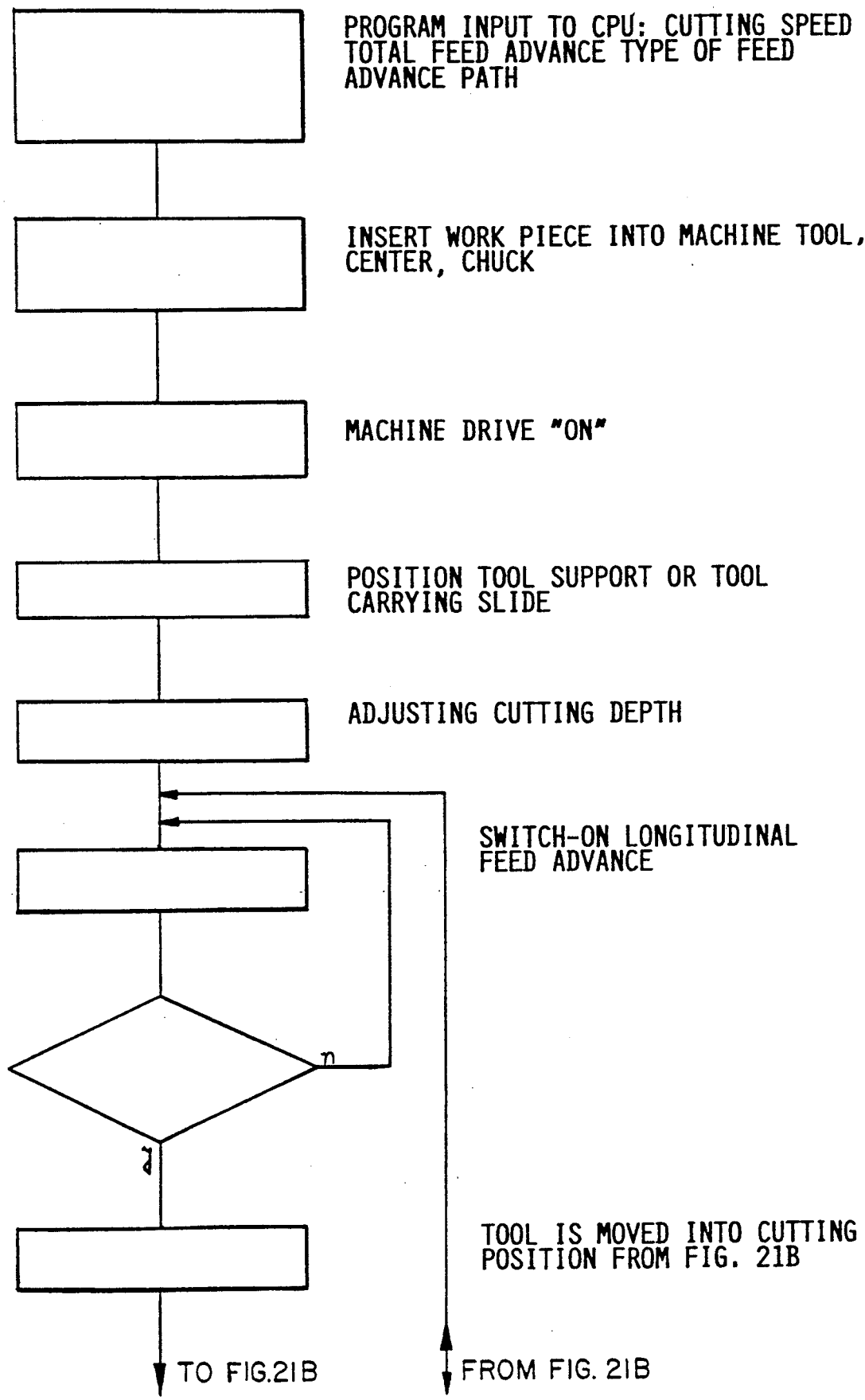

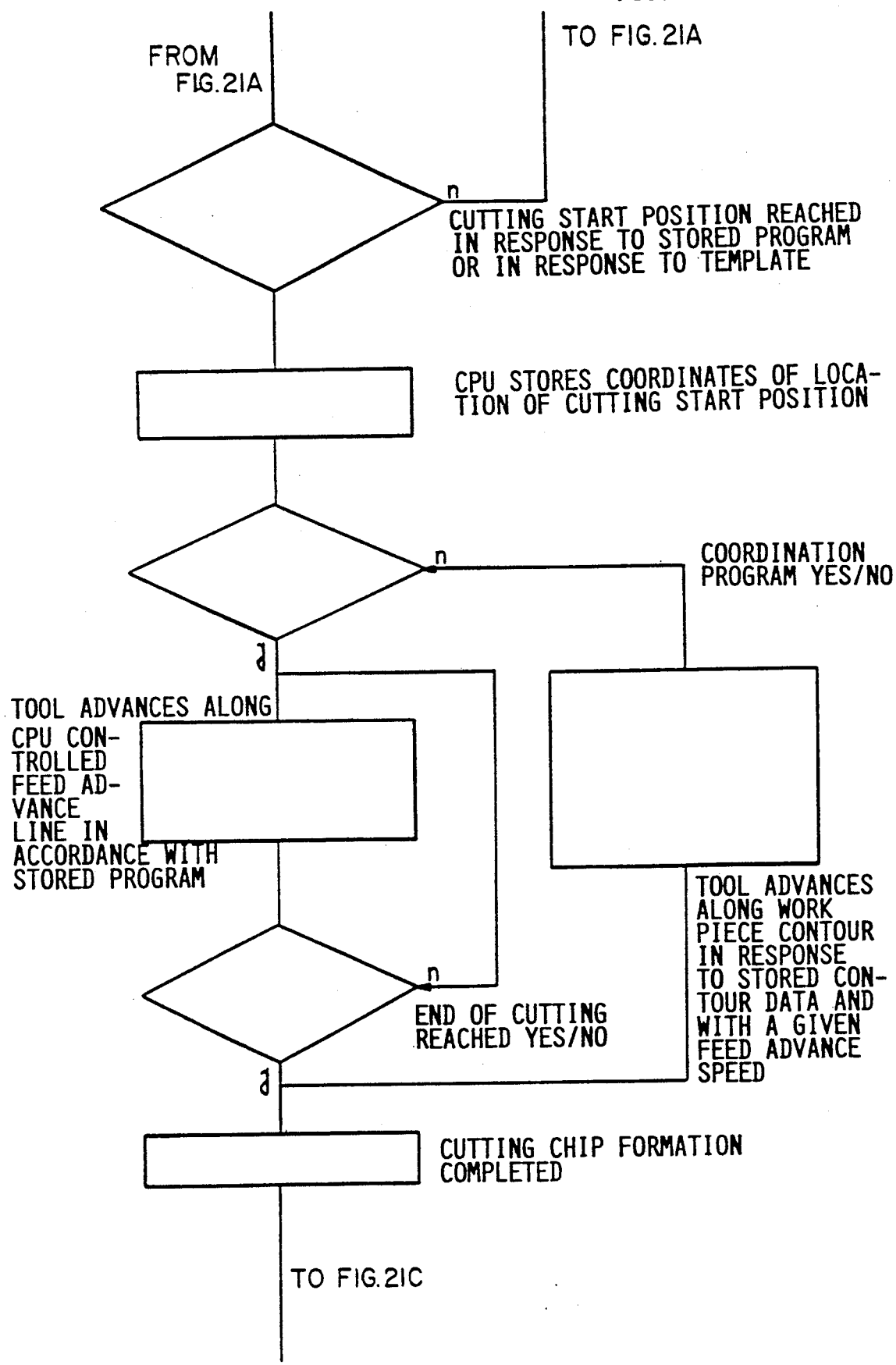

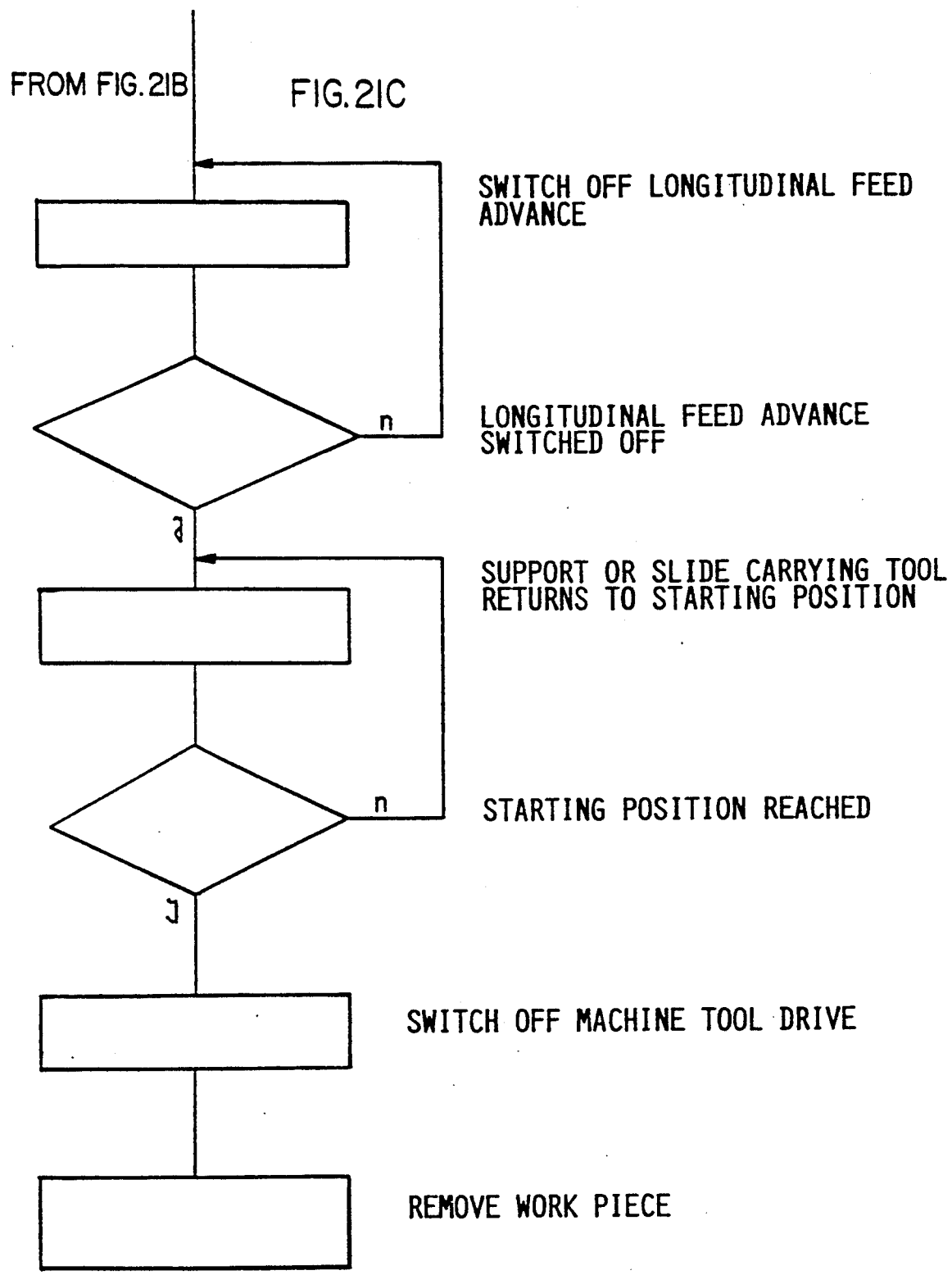

METHOD AND APPARATUS FOR PRODUCING FRACTURED CHIPS WHEN PERFORMING A TURNING OPERATION

FIELD OF THE INVENTION

The invention relates to a method and apparatus for producing fractured chips when performing a turning operation, for example, on a machine tool such as a lathe. Fracturing of the chips is accomplished by a feed advance speed of the turning tool that varies during the rotation of the work piece.

BACKGROUND INFORMATION

U.S. Pat. No. 4,667,546, corresponding to European Patent Publication 0,197,172, discloses a method and apparatus of the above type. In order to assure a satisfactory fracturing of the produced chips, it is necessary in the prior art that the tool oscillates periodically. Additionally, the periodic oscillations must be generated so as to produce an exactly tuned phase shift in the oscillation. Although the known method produces a reliable fracturing of the chips, it has been noted that the surface quality of work pieces produced by the just mentioned method leaves room for improvement.

The above method is also subject to certain limitations when it is applied to heavy duty machining operations, for example the reprofiling of railroad wheel sets. Machining operations of this type regardless whether above floor or under floor railroad wheel set turning machine tools are involved, make it difficult to maintain the above mentioned phase shift in the oscillation of the feed advance speed. It is difficult to maintain the required phase shift because so-called slip may occur between the wheel set and the frictional rollers which drive the wheel set. Similarly, any entraining members or lathe dogs engaging the rotating wheel set may be subject to slip so that again the required phase shift cannot be satisfactorily maintained. As a result, the desired fracturing of the chips is not assured.

THE INVENTION

In view of the foregoing it is the aim of the invention to achieve the following objects singly or in combination:

to provide a method and apparatus which will assure the desired fracturing of the chips in a reliable manner even if the machining operation involves the above mentioned slip under heavy duty machining conditions;

to provide an improved method and apparatus for the truing of railroad wheels; and to assure an improved surface quality of work pieces turned on a lathe in accordance with the present teaching.

SUMMARY OF THE INVENTION

According to the invention the above objects have been achieved by varying at least the scalar value of the feed advance speed of the turning tool cutting edge for a time duration which is short relative to the time duration required for one revolution of a work piece, said varying of the scalar value of the feed advance speed taking place at random timed intervals and at least once for each work piece revolution.

The short duration random variation of the scalar value of the feed advance speed is a special type of feed advance speed that is varied in the course of a work piece revolution. This special random variation of the scalar value of the feed advance speed can be achieved in different ways. For example, the work piece cutting edge may be advanced and/or retracted for short time durations, whereby the feed advance speed of the advancing and the speed of the retracting distinctly differ from the normal feed advance speed outside these brief time intervals. Outside these brief time intervals of distinctly different tool speeds the normal feed advance may be continuous or constant. It has been found that this short duration random change in the feed advance speed by itself may already provide the desired chip fracturing. The cause for this fracturing is the sudden change in the chip thickness. The feed advance speed between these distinctly noticeable changes in the scalar value of the feed advance speed in the circumferential direction, corresponds to the original normal feed advance speed. Therefore, larger straight sections of the feed advance displacement of the cutting tools are provided between the mentioned sections of distinctly different feed advance speeds. These straight sections are advantageous because they assure a certain chip fracture even if the short duration distinctly different scalar value of the feed advance speed alone does not result in chip fracture. In other words, the short duration distinctly different feed advance speeds in combination with the longer duration normal feed advance speeds assure the safe and certain chip fracture because, as the turning continues, the straight sections encounter work piece surface points where the chip thickness becomes zero due to the preceding distinctly different feed advance interval.

The maintaining of a precise phase relationship between the distinctly different feed advance speeds or directions, is not necessary according to the invention. Yet, the desired chip fracture is assured with certainty. Simultaneously, the invention achieves quite surprisingly, a completely normal surface quality or surface image of the machined surface. The image of the machined surface according to the invention is a look-alike of the image of a conventionally machined or turned work piece that has been machined with a steady feed advance of the tool cutting edge. This is surprising because due to the instantaneous changes in the feed advance speed one might expect a marred machined surface configuration.

The method according to the invention can basically be performed with any CNC lathe because such a lathe is programmable, or rather, the CN control is programmable so that the desired tool motions for performing the method according to the invention can be programmed. Conventional CN controls for machine tools are suitable for the present purposes. Software adaptations may be required in accordance with the particular system employed.

Although conventional machine tools with a CN control are suitable for performing the present method, heavy duty chip removal such as the reprofiling of railroad wheel sets, will require the use of machine tools in which the tool proper is mounted on a slide or slides which are operated by means of hydraulic piston cylinder devices providing a hydraulic linear drive. Conventionally, the control of the displacement of the tool is accomplished by a copying template cooperating with a known hydraulic copying sensor, whereby the copying sensor distributes the total volume of hydraulic oil delivered per unit of time. More specifically, the distribution of the hydraulic flow takes place in accordance with the contour to be followed so that the respective linear slide drives, or rather the corresponding hydraulic cylinders receive the proper quantity of hydraulic flow.

The incoming hydraulic flow is controlled in its size by a so-called servo-valve unit, whereby the normal feed advance speed is determined by the size of the hydraulic flow as controlled by the servo-valve unit. Such control takes place in a closed loop manner.

The apparatus used for performing the method of the invention is based on the just described hydraulic drive with their conventional controls. According to the invention such a conventional machine tool is modified to combine the following features, namely a tool mounting means and at least one chip removing tool including a drive for providing the chip removal tool movement between the tool and the work piece and at least one support or slide for carrying the tool. The support or slide is equipped with slide guides or it is guided on a machine bed and equipped with a hydraulically operable linear drive for displacing the slide on the slide guides or the support along guide rails of the machine bed. According to the invention at least one electronic displacement sensor is provided for sensing the motion direction of the tool and the control for the linear drive is equipped with a servo-valve unit which determines the motion direction and the motion speed of the linear drive. Further, the servo-valve unit and the electronic displacement sensor are connected to a programmable electronic control for influencing the hydraulic control of such a machine tool in the manner required for performing the method of the invention. More specifically, the programmable electronic control influences the servo-valve unit in accordance with the program entered into the electronic control, whereby the feed advance speed and the feed advance direction is determined by the program substantially in a closed loop manner. The electronic displacement sensor always reports the instantaneous position of the linear drive as displaced through the servo-valve unit. The instantaneous position of the linear drive represents the instantaneous position of the slide or support connected to the linear drive and thus also of the tool so that through the electronic displacement sensor the control is always informed regarding the instantaneous tool position.

BRIEF DESCRIPTION OF THE DRAWINGS

In order that the invention may be clearly understood, it will now be described, by way of example, with reference to the accompanying drawings, wherein each of:

FIGS. 1 to 17 shows different tool advance paths formed on the surface of a cylindrical work piece having a length L and a circumference U;

FIGS. 21A, 21B, and 21C illustrate a program flow-diagram for performing the present method.

Figure 4:
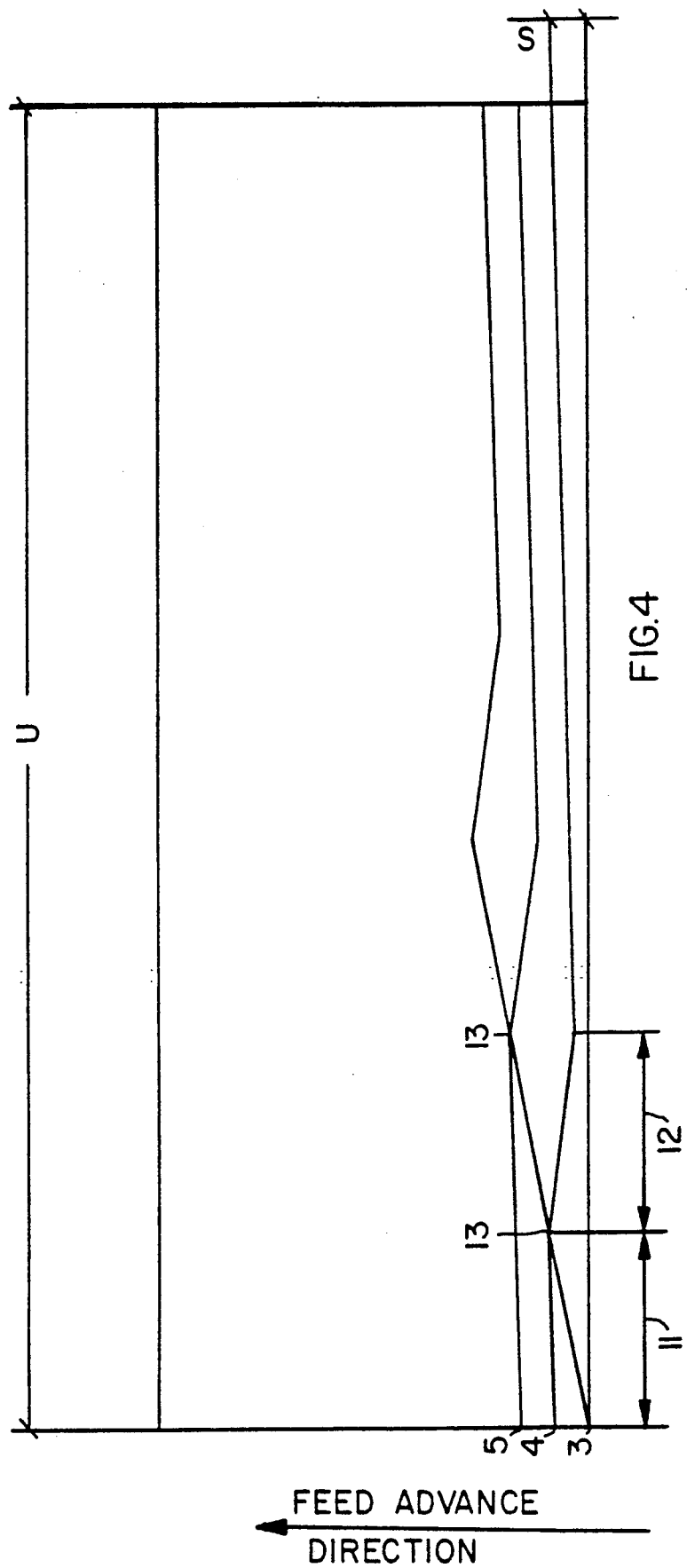
Figure 14:
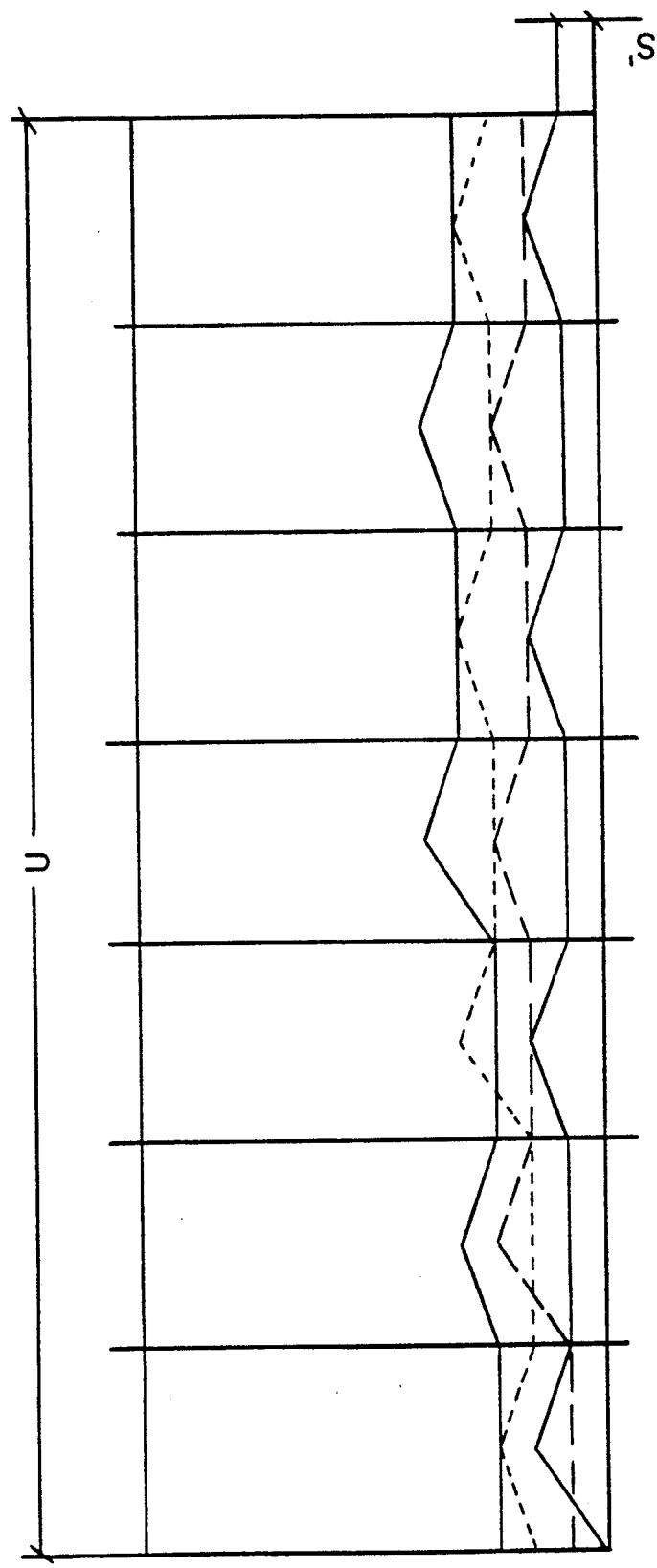
Figure 16:
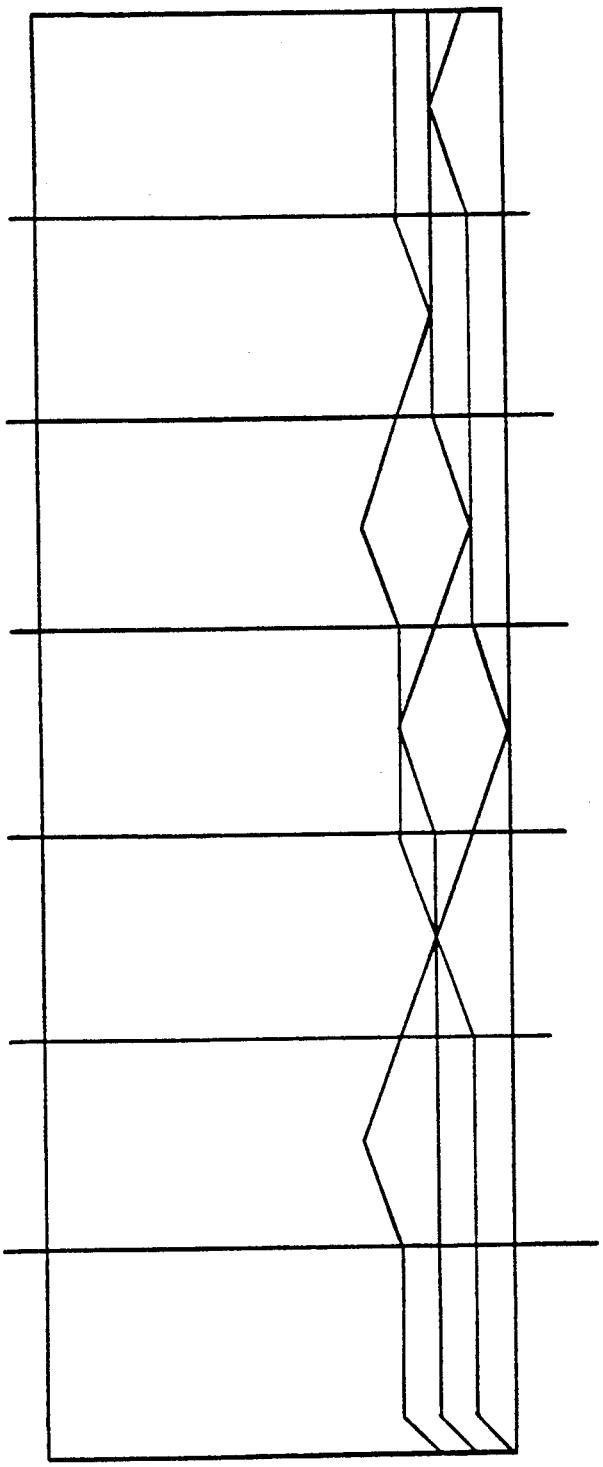
Figure 15:
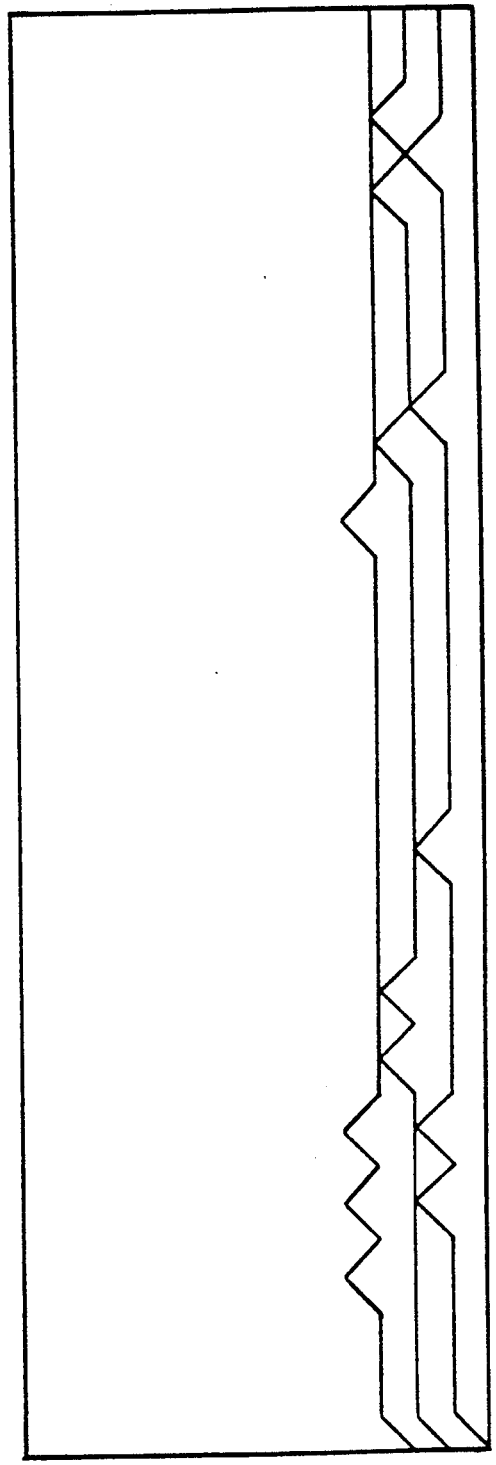
Figure 17:
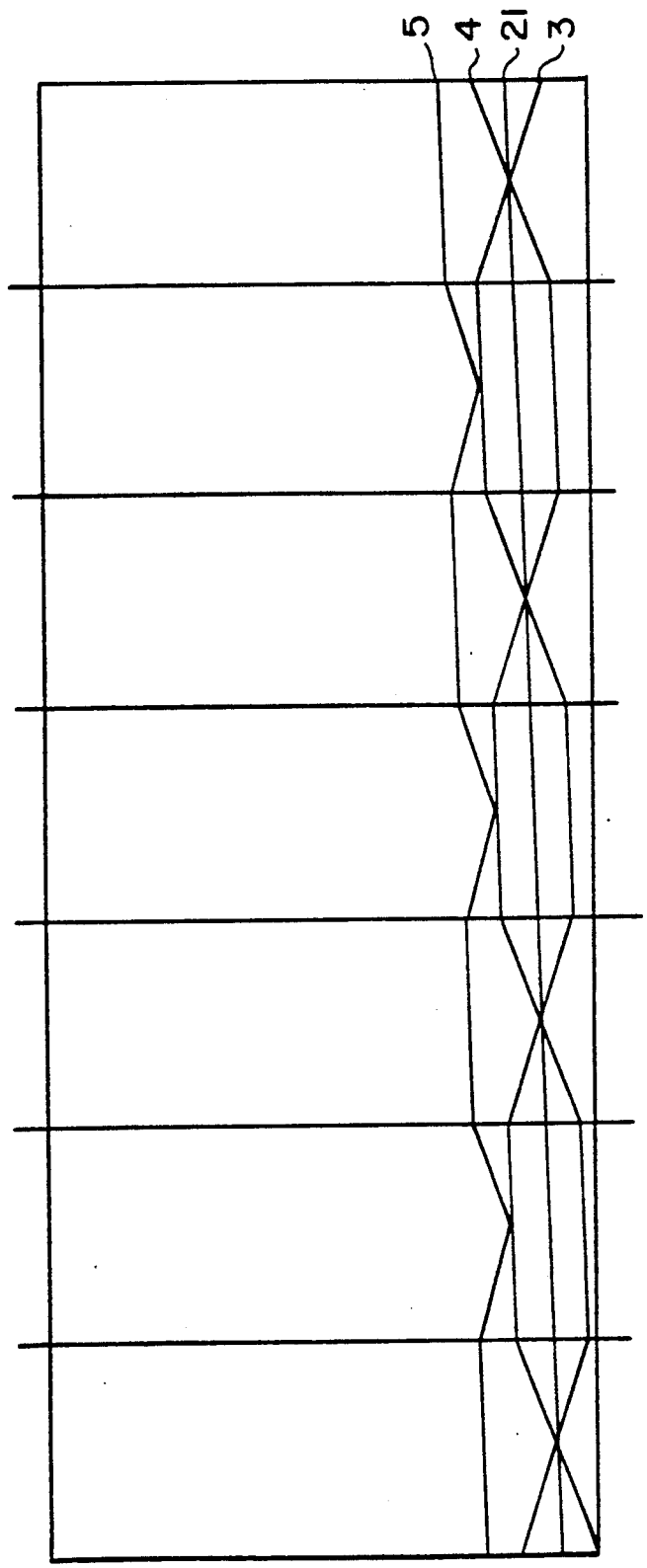

DETAILED DESCRIPTION OF PREFERRED EXAMPLE EMBODIMENTS AND OF THE BEST MODE OF THE INVENTION

FIGS. 1 to 17 show the developed or projected surface of a cylindrical work piece WP having a circumference U and an axial length L extending in the direction of the work piece rotational axis 8. The length L and circumference U are shown only in FIG. 1, but are applicable to all FIGS. 1 to 17. FIG. 1 further shows a cutting tool edge 1 contacting the circumference of the work piece WP. The work piece contour in FIG. 1 is a cylindrical contour shown symbolically at 2 in FIG. 1. Normally, the tool edge 1 moves in the direction of the arrow 9 while the work piece WP is rotated simultaneously about the rotational axis 8. If the feed advance speed of the tool edge 1 is constant, the result would be a uniform spiral or rather helical groove in the manner of a threading on the circumference U of the work piece. The invention avoids such conventional feed advance of the tool edge 1 with a constant speed because experience shows that proper chip breaking cannot be accomplished in this manner. The invention also avoids the periodical feed advance of the tool 1 as described in the above introductory portion of the present disclosure.

According to the invention the tool cutting edge 1 shall be displaced in a manner to be described below. In the embodiment of FIG. 1 the tool cutting edge 1 is not moved continuously, but rather it is moved in the direction of the arrow 9 in a discontinuous manner while the surface of the cylindrical work piece formed by the work piece length L and the work piece circumference U, is rotated continuously at a constant speed about the rotational axis 8. The discontinuous advance of the tool edge 1 results in tool feed advance lines or paths 3, 4, and 5. Each feed advance line 3, 4, 5 corresponds to one revolution of the work piece WP. The feed advance lines 3, 4, 5 are shown to be spaced from one another in an exaggerated manner to facilitate the illustration. According to the invention each of the feed advance lines 3, 4, and 5 comprises sections 10 in which the tool edge 1 is not advanced in the direction of the arrow 9. The sections 10 are followed by sections 11 in which a rapid forward movement of the tool edge 1 in the direction of the arrow 9 is executed. It is desirable in this context that the sections 11 are as short as possible in the circumferential direction because the more rapid the feed advance of the tool cutting edge 1 takes place, the more certain will a chip breaking be achieved. However, it is not necessary that the length of the sections 10 and 11 in the circumferential direction are the same. Rather, the length of these sections 10 and 11 may differ quite considerably. If the advance of the edge 1 in the direction of the arrow 9 takes place very rapidly in the sections or zones 11 it is recognized that through the length of these zones 11 a rapid cross-sectional change or rather reduction in the chip is achieved. This cross-sectional reduction in the chip dimension is sufficient to assure a chip fracture. The fracture is the more certain the more rapid the tool edge 1 is advanced in the direction of the arrow 9 in the zones or sections 11.

However, the chip fracture does not only depend on the rapidity of the tool edge advance in certain zones of the work piece surface. Chip fracture also depends on the type of material of which the work piece is made, for example, alloys. The invention is adaptable to these materials. Such adaptation is shown in FIG. 2, wherein again the work piece surface is cylindrical. The feed advance along lines or paths 3, 4, and 5 in FIG. 2 during three revolutions of the work piece, makes sure that during the section 11, the tool edge 1 is rapidly advanced into the work piece to such an extent that at points 13 a straight section or zone 10 of the next neighboring feed advance line or path is met. As a result, the cross-sectional diameter of the chip or rather the chip thickness becomes zero at points 13, whereby chip breaking is positively assured. The points 13 do not need to have an exactly uniform spacing from one another, nor do they require an exact phase shift relative to corresponding tool motions during a preceding work piece revolution. Rather, the points 13 may be located at any desired or random position along the zones or sections 10. If one now elects the length of the section or zone 11 sufficiently short, it becomes unnecessary to pay attention to the circumference of the work piece when programming the control for producing the feed advance of the edge 1 along the feed advance lines or paths 3, 4, and 5. This is so because chip fracture would not occur only at those portions along a feed advance path 3, 4, 5 where the sections 11 are arranged one on top of the other in the feed advance direction 9. Such occurrence, namely that the sections 11 are lined up with each other in the feed advance direction 9 is so rare that it does not need to be taken into account for all practical intents. Thus, it is very simple to determine the maximal length of the chips without regard to the work piece diameter by merely determining or defining the length of the sections 10. As a result, it becomes possible according to the invention to assure chip breakage without the need for oscillating the tool or at least the tool edge with any high frequency. It has been found that such tool oscillations result in a less than desirable work piece surface. The chip breaking according to the invention is also assured without any need for coupling the feed advance motion to the r.p.m. of the work piece. In other words, according to the invention, a tool feed advance with due regard to the work piece rotation is unnecessary, which simplifies the control. It is also unnecessary to make sure that certain points of motion and thus cutting lines along the work piece surface coincide exactly with each other as is necessary, for example in the above mentioned European Patent Publication 0,197,172. Rather, according to the invention it is possible to assure a proper chip breaking by a time controlled feed advance. However, it may be advantageous for performing the present method to at least ascertain the completion of a full work piece revolution, as will be described in more detail below.

Due to the fact that the tool edge 1 must advance sufficiently in the sections 11 to meet the section 10 in the next feed advance line during the next revolution of the work piece, the total feed advance displacement for each revolution would grow too rapidly. Thus, the invention teaches to pull the edge 1 back again when passing through a zone 12. The extent of this moving or feeding back of the tool edge 1 is determined in such a way that the total feed advance over one revolution of the work piece results in an acceptable or desired total feed advance along the work piece WP.

FIG. 3 shows a modification in which the feed advance lines 3, 4, and 5 exhibit a different characteristic. In FIG. 3 zones or sections 10 are also present during which the edge 1 does not perform any feed advance motion. The sections 10 are again followed by sections 11 in which a rapid tool motion takes place. However, that tool motion is not a feed advance, but rather a retreat motion in a direction opposite to the feed advance motion. Here again, the retreat movement can be performed to such an extent that a straight section 10 on a feed advance line or path formed during the preceding revolution of the work piece is contacted during the next revolution. Again, points 13 are formed in which the chip thickness becomes zero thereby assuring the desired chip breaking. The section or zone 11 is again followed by a section or zone 12 in which the edge 1 is advanced into the work piece to a sufficient extent to provide a feed advance. The section 12 is followed by a further straight section 10. However, the second section 10 is located further away from the lower edge of the work piece surface in the direction of the feed advance 9 as compared to the first mentioned section 10 so that the sections 10 form steps separated by the sections 11 and 12. As a result, a total feed advance is achieved for each revolution of the work piece even though during sections 10 the tool edge 1 is not advanced in the feed advance direction 9.

FIG. 4 illustrates another modification in which the tool edge 1 has a substantially constant feed advance speed, except in zones 11, whereby the feed advance for each revolution corresponds to "S". The permissible total length of each chip can correspond in this instance to the circumference U of the work piece. To assure proper chip breaking at this chip length, a rapid feed advance motion is superimposed in the zones 11 on the continuous or constant feed advance speed. It is not necessary in this connection that the rapid feed advance motion passes through a distance that is larger than the feed advance S for making sure that during the next revolution of the work piece the normal feed advance line contacts the feed advance line of the preceding revolution in the zone 11 at the point 13. In order to achieve this contact at point 13 and hence the desired chip breakage, due to the reduction of the chip thickness to zero, it is merely necessary to make sure that the new rapid feed advance motion of the tool edge 1 for producing the section 11 takes place only when at least one revolution plus the length of the section 11 in the circumferential direction have been completed. It is not necessary to perform the next rapid feed advance motion exactly when the just defined distance has been completed. Rather, it is sufficient when the next rapid motion is performed after at least that distance has been completed subsequent to the previous rapid motion. In other words, it is not critical if the actually passed distance is larger than the just mentioned minimal distance of one revolution plus the length of the section 11 in the circumferential direction. Proper chip breakage is assured if this minimal distance is satisfied between successive rapid motions. In FIG. 4 again a withdrawal section or zone 12 follows the rapid advance motion 11, whereby the total feed advance desired for each revolution is easily controlled.

FIG. 5 shows a modification with feed advance lines 3, 4, and 5 quite similar to those of FIG. 2. As mentioned, in FIG. 2 the sections 10 represented no feed advance motion of the edge 1 at all. Contrary thereto, the sections 10' in FIG. 5 do represent a feed advance of the tool edge 1. According to FIG. 5, the tool edge 1 is advanced continuously as in FIG. 4 in a forward direction. Additionally, rapid feed advance motions alternate with the continuous feed advance motions just as in FIG. 4. Thus, the embodiment of FIG. 5 is a combination of FIGS. 2 and 4. During the sections 12 in FIG. 5 the tool edge 1 is pulled back to the feed advance line of the continuous feed advance.

The modification of FIG. 6 is quite similar to that of FIG. 5. However, the basic feed advance S1 is smaller than the total feed advance S in FIG. 5. This feature also constitutes a means for influencing the surface image of the machined work piece. The motion of the tool edge 1 takes place in the embodiment of FIG. 6 substantially in the same manner as described above with reference to FIG. 5. However, in the sections 12' the tool edge 1 is not pulled back to the line of the basic feed advance. Such pull back would lead to a feed advance S1 during one revolution. Rather, in FIG. 6 the tool edge 1 is not pulled completely back to the line of the basic feed advance S1 so that between the line of the basic feed advance S1 and the line following the pull-back 12 a spacing S' remains. The same happens following the next pull-back not completely to the base line S1 so that again a spacing S' remains. As a result, the total feed advance S for one revolution of the work piece will correspond to the basic feed advance S1 plus the sum of the individual feed advance steps S'.

The modification of FIG. 7 corresponds substantially to that of FIG. 6. However, in FIG. 7 it is shown that it is possible to modify the motion characteristic of the tool edge 1. Such modification is advantageous, especially if the contour of the work piece 2 is not cylindrical, but rather substantially curved as is, for example, the case for a circumferential contour of a railroad wheel that requires truing. FIG. 7 shows, for simplicity's sake a cylindrical work piece surface projected into the plane of the drawing. However, the embodiment of FIG. 7 is particularly suitable for use in connection with curved work piece surfaces, such as the rim contour of a used railroad wheel requiring truing. In FIG. 7 the feed advance line 6 following the advance line 5 represents a continuous advance while the next feed advance line 7 is performed with reverse or retreat motions as described with reference to FIG. 3. This feed advance again achieves chip fracture with certainty and the desired high quality surface image. Chip breakage will occur at the points of contact between the neighboring feed advance lines. Using a continuous feed advance line 6 between neighboring lines 5 and 7 as shown in FIG. 7 prevents that any particular phase relationship needs to be maintained for the rapid forward advance motions or the retreat motions of the tool edge 1.

FIG. 8 shows a modification similar to that of FIG. 3, however, in FIG. 8 the tool edge 1 is advanced continuously so that during the sections 10" the tool edge also moves continuously rather than without feed advance speed as in FIG. 3.

FIG. 9 illustrates the application of the teaching of the invention to a so-called ratchet feed advance. In a conventional ratchet feed advance the entire feed advance to be made during one revolution of the work piece WP is accomplished in the section 14, whereby the revolution starts at point 15. After the section 14 has been passed through by the tool edge 1, the latter is not subject to any further feed advance during the completion of one full revolution at point 16. At that point 16 the next revolution begins and the respective feed advance is again completed along 14'. In this manner it is not possible to assure a certain chip fracture unless the section 14 is sufficiently short or stated differently, the feed advance speed of the tool edge 1 sufficiently fast for causing a sufficiently large rapid chip cross-sectional change. However, such chip cross-sectional reduction was not achieved conventionally because it was not feasible to expose the machine tool to such sudden load changes which would tend to quickly damage the machine and its tool. Hence, heretofore, rapid load changes were avoided and proper chip breakage was not assured. Contrary thereto according to the invention the new feed advance is not applied at point 16, but only after passing through a section 14 so that the new feed advance begins at point 17. It has been found that with this type of advance chip breakage will occur with certainty at point 18 at the latest. Thus, the circumference U1 is "turned", so to speak, at least by a circumferential length corresponding to section 14, whereby a certain chip breakage is obtained. It is in this connection not necessary that the circumferential rotation is changed by the section 14. It is sufficient if that section 14 is maintained at least. An increase in the circumferential change for each revolution does not adversely affect the desired chip breakage. However, the additional circumferential sections 14 should be kept to the required minimum to avoid unnecessarily increasing the machining time.

It should be mentioned expressly at this point that according to the invention it is not necessary to reach zero chip thickness at points 13 to obtain a positive chip breakage.

The points 13 can be so positioned that the chip thickness at these points is not reduced to zero, but rather reaches a certain minimum at which the chip will break. This minimum chip thickness will depend on the type of material to be machined and is easily ascertained by simple test runs. For machining very tough materials it is recommended to not only let the chip thickness become zero at points 13, but to provide for such a tool edge displacement at points 13 that a "negative" chip thickness is obtained to thereby make sure that chip breakage is achieved. This "negative" chip thickness is obtained by moving the tool edge in the respective required direction by a suitable extra displacement, either in the feed advance direction or in the retreat direction.

FIG. 10 shows a tool motion pattern with a first cut, a second cut, and a third cut in which the tool edge 1 advances by the distance S during each revolution of the work piece. In this pattern the tool may move substantially at random one or several times back and forth in the feed advance direction as shown in sections 19 which are then followed by a continuous or constant feed advance along sections 20. The back and forth movements along section 19 are more rapid movements compared to the continuous advance along sections 19. As a result of this tool movement pattern points 13 are formed at short spacings from one another along the cutting direction or path. The chips will break at these points 13. The chip length depends on the spacing between neighboring points 13 and is reliably short. Even though the motion of the tool edge 1 along the sections 19 and 20 takes place at random, a positive chip breakage at short intervals is assured without any maintaining of a certain phase relationship between the tool motions during one revolution and the tool motions during the next revolution of the work piece.

FIG. 11 shows feed advance lines 3, 4, and 5, wherein the sections 11 and 12 are formed during each revolution of the work piece by alternating tool motions in the forward feed advance direction with tool motions in the opposite or retreat direction. Intermediate these alternate tool movement directions there are again sections 10 of a continuous or constant tool feed advance motion. This pattern also assures the desired surface quality of the finished work piece and a positive chip breakage. As shown in FIG. 11 the same phase relationship is always maintained, however, that is not necessary. In the course of a machining operation, the feed advance lines 3, 4, and 5 may shift in their phase position relative to one another. Nevertheless, the desired chip breakage is obtained with reasonable certainty. However, in the pattern of FIG. 11 an adverse phase relationship may occur in very narrow ranges where the chip breakage may not occur. When the phase relationship is shifted continuously, these adverse zones are very short so that the tool passes quickly through these zones and chip breakage again occurs outside these zones. This feature of the invention is advantageous because, contrary to the above mentioned prior art which always requires an exact phase relationship in order to assure chip breakage, the invention does not require such a phase relationship.

FIG. 12 is a modification of the tool motion illustrated in FIG. 11, whereby following a rapid forward motion of the tool the tool performs a retreat motion, not only to the basic feed advance line, but beyond the basic feed advance line all the way to the straight section of the preceding feed advance line, whereupon the tool is returned in a forward motion to the basic feed advance line of each revolution. In this type of tool motion again the chip breakage is assured with certainty independently of any phase position of the different motions relative to each other during each revolution of the work piece.

FIGS. 13 to 17 show further examples of feed advance motion combinations of the work piece edge 1 resulting in a positive chip breakage. With regard to FIG. 17, it should be mentioned that in addition to the feed advance lines 3, 4, and 5, there is a feed advance line 21 having a constant feed advance speed which also assures positive chip breakage. The feed advance line 21 of FIG. 17 can be compared to the feed advance line 6 of FIG. 7.

It is advantageous to keep the sections 11 and as far as they occur, also the sections 12 along the feed advance lines as short as possible. When these sections are short, the chip breakage is improved and the surface image of the machined work piece is also improved. By determining the length of the zones 10, it is possible to determine the desired chip length.

For performing the method according to the invention conventional computer numerically controlled machine tools can be used. Such tools must be capable of following the programming that will result in the above described tool motions. For this purpose it may be necessary to modify the operational software of such machines based on the present disclosure by establishing programs that will cause the above described motion sequences. The flow diagram shown in FIGS. 21A, 21B, and 21C with the instructions shown therein are self-explanatory in the light of the foregoing description of FIGS. 1 to 17.

Figure 19:
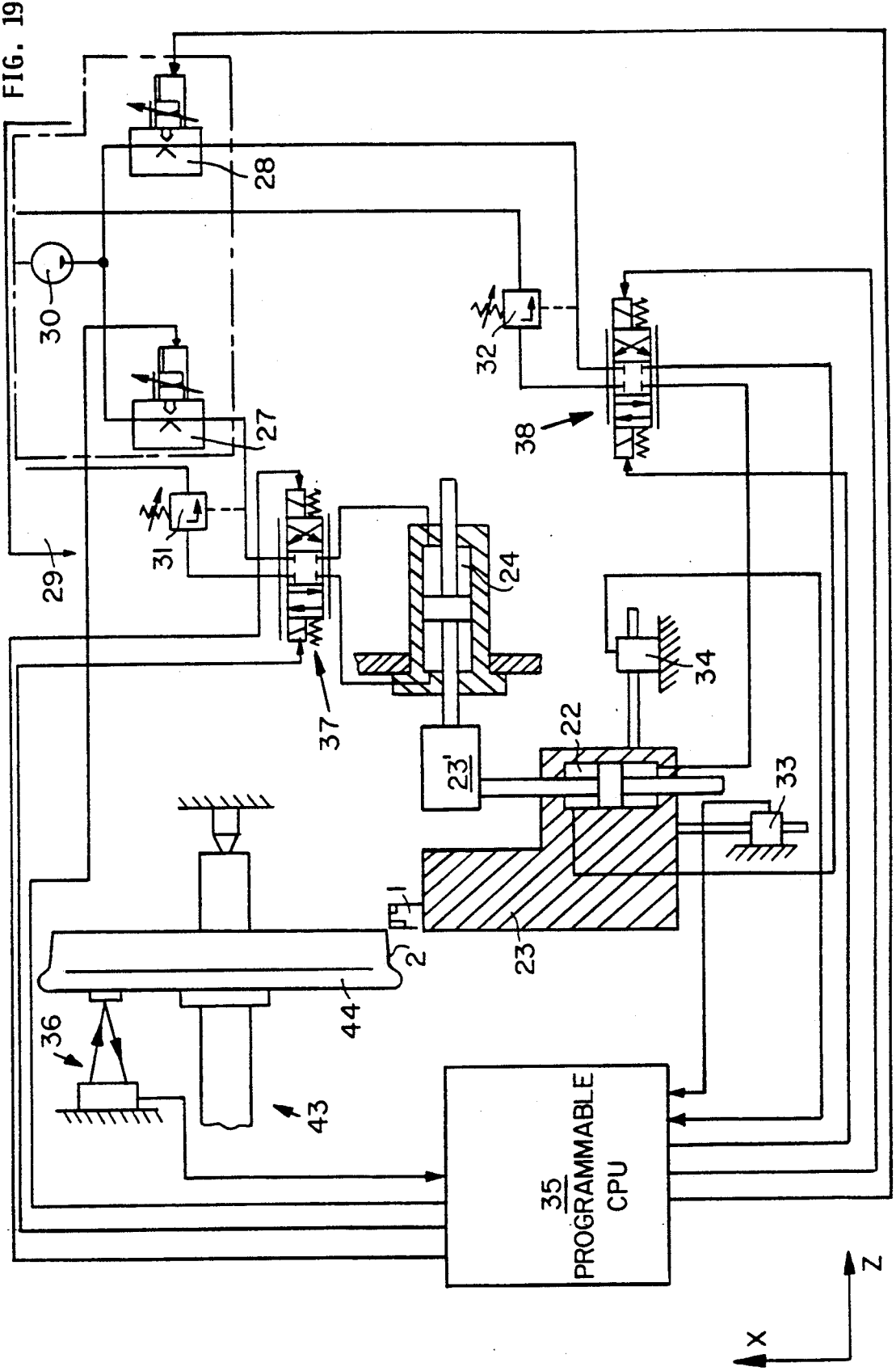
FIG. 19 is a hydraulic circuit diagram similar to that of FIG. 18 but showing proportional displacement valves.
Figure 20:
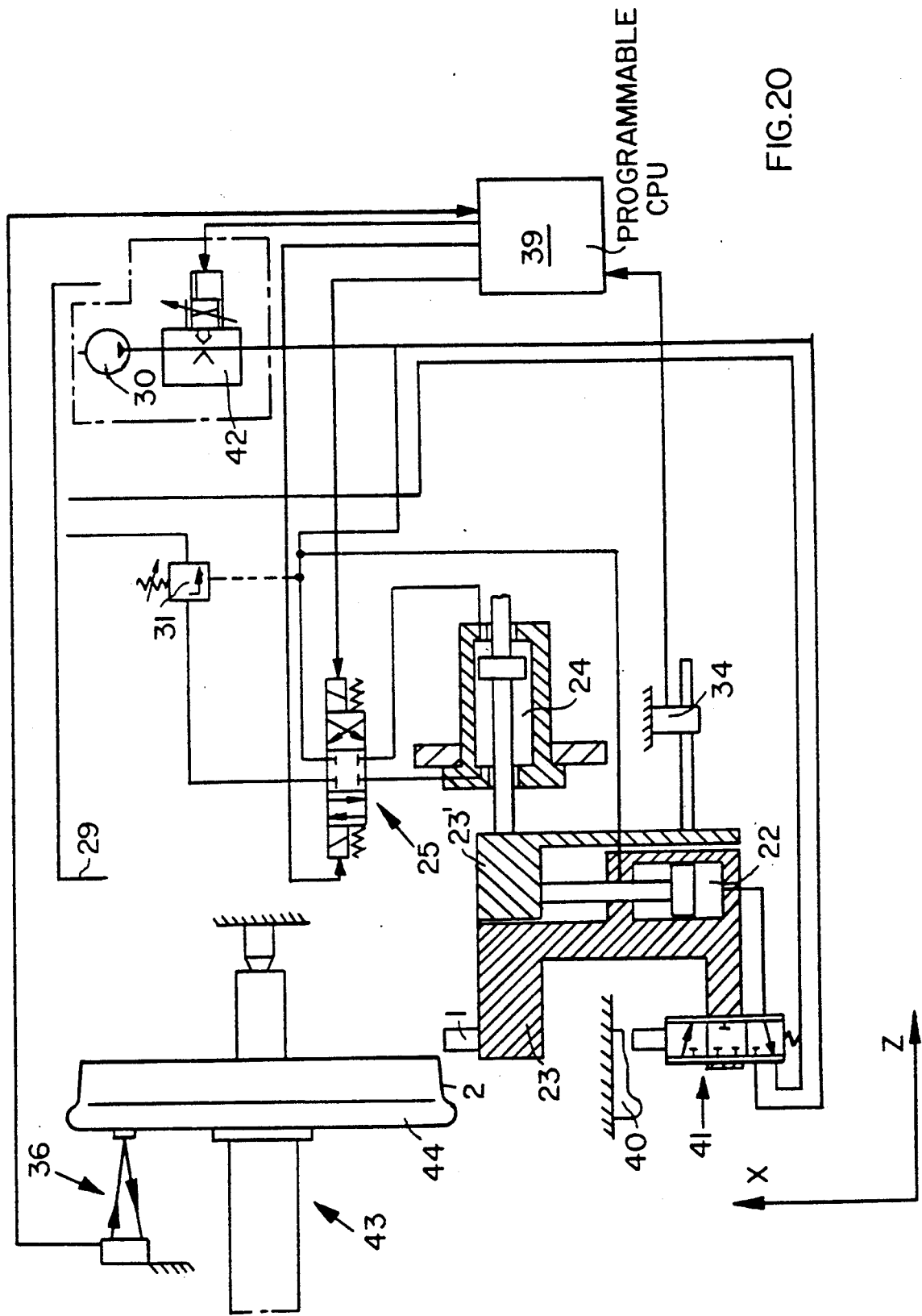
FIG. 20 is a modification of the circuit diagram of FIGS. 18 and 19, wherein the work piece contour is not stored in the control program, but rather is provided by a copying template which is sensed by a template sensor.

Further, hydraulically operated and controlled machine tools are also suitable for the present purposes, along with the machine tools described in the above mentioned European Patent Publication 0,197,172. Such machine tools, however, must be modified for the present purposes as will be described below with reference to FIGS. 18 to 20 showing modifications in the control system of these machines.

Figure 18:
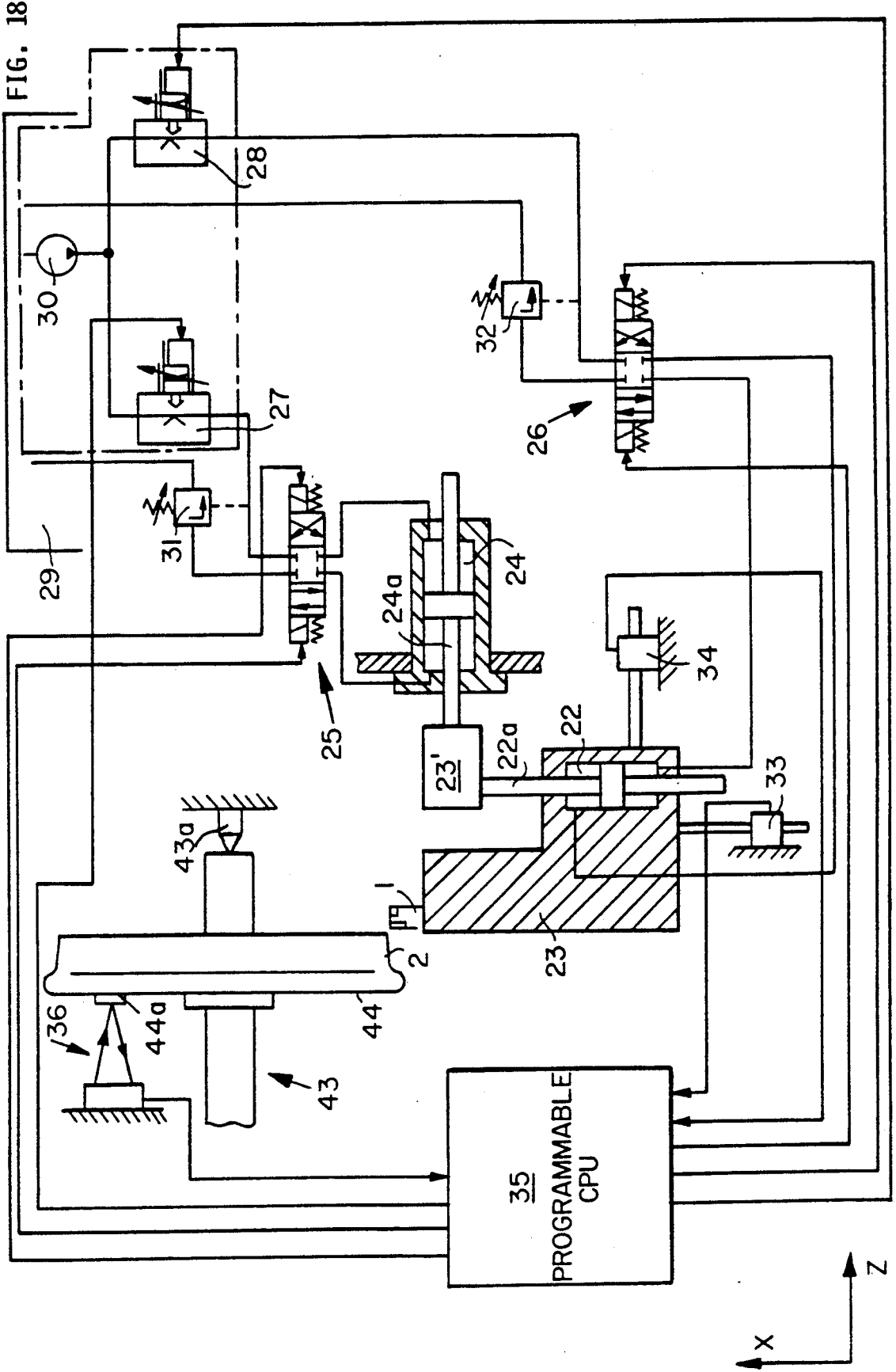
FIG. 18 is a hydraulic circuit diagram of an apparatus for performing the present method.

FIG. 18 shows a conventional wheel set 43 clamped between points 43a of which only the right-hand point is shown in FIG. 18. Each set has two wheels 44, only the right-hand wheel is shown. Each tool edge 1 also symbolically shown in FIG. 1 is carried by a support or slide 23 movable in a horizontal direction by a piston cylinder device 22. The surface 2 to be machined is the circumferential surface of the wheel 44 to be trued. A further piston cylinder device 24 permits a longitudinal movement of the support 23 perpendicularly to the motion direction caused by the piston cylinder device 22. The just described driving means with the piston cylinder devices 22 and 24 are conventional and may form part of a so-called cross-slide. The piston rods 22a and 24a are interconnected at 23'. Although only one driving mechanism 22, 24 is shown, a separate driving mechanism of the just described type may be provided for truing each wheel.

Each piston cylinder device 22, 24, comprises a conventional four/three-way valve 25 and 26. A four/three-way valve is a valve that has four connecting ports and is capable of assuming three different valve positions. Such valves are conventionally operable by electromagnetic means such as a solenoid.

In the centered position of the valve plug all hydraulic flows are stopped so that the pistons in the cylinders 22 and 24 also do not move. The connection of these valves 25, 26 to their respective cylinders is clear from FIG. 18. Hydraulic oil under pressure is supplied to these valves by a conventional hydraulic pump 30 through respective servo-valves 27, 28. The oil is contained in a tank 29 merely symbolically shown in FIG. 18. Biased return flow valves 31 and 32 make sure that the oil is returned into the tank or reservoir 29. The biased valves 31 and 32 also assure that the return flow of the oil takes place at a certain pressure so that the return flow conduit does not run empty, so to speak, and thus would be able to entrain air into the hydraulic system. The valves 31 and 32 avoid such air entrainment.

The support 23 comprises two electronic displacement sensors 33 and 34, one for each displacement direction. The apparatus further comprises an r.p.m. sensor 36 arranged to measure at least one full revolution of the wheel 44. Any suitable conventional device can be used for measuring the revolution of the wheel 44. For example, a so-called resolver could be connected to the main spindle of the apparatus. In many instances a magnetic platelet 44a attached to the wheel 44 could produce the required impulse signal for counting the revolutions of the wheel 44. Similarly, optical means could be used for this purpose. The revolution counter 36, the displacement sensors 33 and 34, and the electromagnetic valves 25 and 26, as well as the respective electrical control means for the servo-valve units 27 and 28 are all connected to the programmable electronic central processing unit 35. In the embodiment of FIG. 18 the work piece contour 2 of the wheel 44 is stored in a memory in the central processing unit 35. This unit 35 is so programmed that the four/-three-way valves are influenced to bring these valves into the switching positions necessary for moving the pistons in the piston cylinder devices 22 and 24 in such a way that the tool edge 1 moves along the work piece contour 2 to be produced. For this purpose the CPU 35 receives the required displacement informations from the linear displacement sensors 33 and 34. By respectively switching the four/-three-way valves 25 and 26 it is possible to obtain the desired feed advance direction and by a respective adjustment of the servo-valve units 27 and 28 the feed advance speed may be controlled by the CPU 35 in accordance with the respective program steps. The CPU 35 receives the information required for this purpose from the r.p.m. sensor 36 providing an indication whether subsequent to the most recent complete revolution again a further full revolution has taken place. The r.p.m. sensor 36 can simultaneously count the number of revolutions and store the counted number. In order to perform a short duration rapid feed advance motion or a retreat motion that deviates from the CPU 35 switches the tool 1 for movement in the desired direction by properly switching the four/three-way valves 25 and 26. Since the desired speed for the deviating movements of the tool 1 is also known from the program stored in the memory of the CPU 35, it is possible for the CPU 35 to control the servo-valve units 27 and 28 in accordance with the instantaneous requirement, whereby one or the other or both of these servo-valve units 27 and 28 can be controlled for the required hydraulic oil throughput necessary for the required speed of the tool 1. Simultaneously, the CPU 35 can store in its memory an information at which location, for example during the first revolution of the wheel 44, a deviating tool motion has been performed by the tool 1 and what kind of a motion it was, for example, forward or backward. The CPU 35 may be so programmed that based on the information received during the first revolution of the wheel 44, the CPU 35 automatically calculates what tool motions are necessary during the second revolution to assure a positive chip breakage in accordance with FIGS. 1 to 17 as disclosed herein. Thus, the tool motions during a following revolution may be controlled with reference to tool motions during a preceding revolution. This is possible without any problems because according to the invention the condition for chip breakage is very simple, namely to reduce the chip thickness to zero. However, it is also possible to completely disregard the tool motions during a preceding work piece revolution and to move the tool during each revolution for a short time duration either in the forward direction or in a retreat direction relative to the feed advance direction and the required chip breakage will still be obtained.

FIG. 19 shows a modification of the embodiment of FIG. 18, whereby the only difference resides in that in FIG. 19 the four/three-way valves 25 and 26 have been replaced by proportional valves 37 and 38. These proportional valves have the ability to control the through flow quantity in addition to a shut off or opening function. In the embodiment of FIG. 19 the servo-valves 27 and 28 can be opened to their maximum extent to provide the maximum displacement speed of the tool edge 1. The proportional valves 37 and 38 which are also connected to the CPU 35 then provide the speed and motion direction which is instantaneously required in accordance with the program in the CPU 35. Otherwise, the embodiment of FIG. 19 functions in the same way as the embodiment of FIG. 18.

FIG. 20 shows a modification of the embodiment of FIGS. 18 and 19. In FIG. 20 a typical hydraulic copying or template control is used. Such template control by itself is, for example, shown in FIG. 10 and described in the above mentioned European Patent Publication.

In the present description of FIG. 20, the same reference numbers are being used for those components which are the same in FIGS. 18 and 19. According to FIG. 20, the feed advance speed in the direction given by the copying or control template 40 and sensed by the sensor valve 41, is controlled by the servo-valve unit 42. This servo-valve unit 42 determines the maximum hydraulic oil supply since unit 42 is constructed as a flow control valve. The flow control servo-valve unit 42 is connected to the programmable electrical control 39. The four/three-way valve 25 and the device 36 are also connected to the control 39 so that these units can be influenced by the programmable control 39 and so that the latter can receive information from these units. Further, the support 23 also comprises an electrical displacement sensor 34 which is effective in the longitudinal displacement direction of the support 23.

In the embodiment of FIG. 20, the contour of the work piece 2 is not stored in the memory of the control 39. Rather, the contour of the work piece 2 is given by the copying control template 40 and sensed by the sensor valve 41 which controls the oil flows to the cylinders 22 and 24. In this connection the cylinder 24, or rather, the motion of its piston rod constitutes a control or guide feed advance in a guide direction. In other words, the feed advance motions which are not to be performed by the tool edge 1 in the direction of the longitudinal movement of the piston rod of the piston cylinder device 24, are performed with such a speed that the tool follows the work piece contour 2. In this context the feed advance speed in the guide direction can be given and constant or it may be variable. In any of these instances, the given or sensed work piece contour 2 will be followed. This means, for example, that the tool edge 1 must be moved with a component perpendicularly to the guide feed advance direction the faster the steeper this component is. This is so because the feed advance speed in the guide feed advance direction remains unchanged or is given. A speed change in the sense of the tool edge motions as explained above with reference to FIGS. 1 to 17 is produced by the control 39 through the servo-valve unit 42. A direction reversal is produced by a switch-over of the four/three-way valve 25.

In the embodiments of FIGS. 18 to 20, it is made certain that each motion of the tool edge 1 always takes place along the given work piece contour 2.

The CPUs 35, 39 receive information through the device 36 or through any other known and suitable means. These informations relate to the cutting speed to be produced or which is being produced so that the respective feed advance speed may be adapted to the required cutting speed.

Although the invention has been described with reference to specific example embodiments it will be appreciated that it is intended to cover all modifications and equivalents within the scope of the appended claims.

What we claim is:

1. A method for fracturing chips during a turning operation on a revolving work piece in a lathe having a turning took, comprising the following steps:
   (a) advancing said turning tool during first long time intervals along a contour to be machined on said work piece, at a first feed advance speed that is constant for forming substantially spiral portions of feed advance lines (3, 4, 5, 6) around said work piece contour,
   (b) advancing said turning tool during second short time intervals with at least one second feed advance speed that differs from said first constant feed advance speed sufficiently to cause neighboring feed advance lines to approach each other during said second short time intervals for sufficiently reducing a cross-sectional dimension of said chips to assure a chip fracture, and (c) controlling a succession of said first long time intervals and said second short time intervals in such a manner that said second short time intervals are short relative to the time duration of one work piece revolution and so that said first long time intervals are substantially longer than said second short time intervals, whereby said first and second time intervals alternate with each other as the work piece rotates.

2. The method of claim 1, wherein said second different feed advance speed is larger than said constant first feed advance speed.

3. The method of claim 1, wherein said second different feed advance speed is smaller than said constant first feed advance speed.

4. The method of claim 1, wherein said second different feed advance speed reverses the direction of feed advance motion.

5. The method of claim 1, wherein said step of controlling the succession of said first long time intervals and said second short time intervals comprises establishing a normal feed advance path of said turning tool along a work piece contour substantially in a circumferential direction of said work piece along said feed advance lines during said first long time intervals when said feed advance speed is constant, and so that said different feed advance speed causes said turning tool to deviate from and then return to said normal feed advance path during said second short time intervals, whereby said constant feed advance speed is resumed when a short time interval ends.

6. The method of claim 1, wherein said first long and second short time intervals and thus said feed advance lines substantially in the circumferential direction of the work piece, follow each other in succession in such a way that said second short time intervals when said second different feed advance speed is applied, fall at least once during the next following work piece revolution, into a circumferential angle sector in which during a preceding work piece revolution said constant feed advance speed was applied.

7. The method of claim 1, wherein a displacement of a tool edge of said turning tool during said second short time interval when said second different feed advance speed is applied, is not appreciably larger than the tool edge advance during one work piece revolution.

8. The method of claim 1, wherein a feed advance distance through which the tool edge travels during said second short time intervals, is partially reduced by withdrawing a tool edge of said turning tool in an opposite retreat direction within said short time intervals.

9. The method of claim 8, wherein said withdrawing of said tool edge passes through approximately the same sector circumferential angle as the tool edge passes through in a forward feed advance during the respective short time interval.

10. A method for fracturing chips during a discontinuous feed advance of a tool edge performing a turning operation on a revolving work piece, comprising the following steps:

(a) normally advancing said tool edge at a constant feed advance speed during first time intervals of long duration, (b) increasing the feed advance speed during second time intervals of short duration corresponding to a small fraction of one work piece revolution, whereby said cutting tool edge advances faster in a feed advance direction during at least a portion of said short duration time intervals, (c) decreasing said faster feed advance speed to zero also during said short duration time intervals, and (d) repeating said increasing and decreasing of the feed advance speed at random times which are at least equal to or larger than a time duration required for one work piece revolution plus said short time duration, whereby said first long duration time intervals alternate with said second short duration time intervals as said work piece rotates.

11. The method of claim 10, wherein said second short duration time intervals have short random durations.

12. The method of claim 11, comprising storing said constant feed advance speed in a memory of a CPU, determining and storing a feed advance of a preceding work piece revolution in said memory, calculating a feed advance for the next following revolution of said work piece on the basis of said feed advance of a preceding revolution, so that said turning tool is moved during a following work piece revolution to briefly contact a feed advance line of a preceding work piece revolution, and applying the calculated feed advance to a tool feed advance control, so that chip fracturing is assured at said contact, said contact taking place at time intervals corresponding to the desired maximum length of a chip.

13. The method of claim 10, wherein any feed advance at said constant feed advance speed and at said increased and decreased feed advance speeds takes place exclusively along a work piece contour to be produced on said work piece.

* * * * *

UNITED STATES PATENT AND TRADEMARK OFFICE
CERTIFICATE OF CORRECTION

PATENT NO. : 5,019,115

DATED : May 28, 1991

INVENTOR(S) : Friedhelm Schneider et al.

It is certified that error appears in the above-identified patent and that said Letters Patent is hereby corrected as shown below:

Claim 1, Column 12, line 59, replace "took" by --tool--.

Signed and Sealed this

Twenty-second Day of September, 1992

Attest:

DOUGLAS B. COMER

*Attesting Officer*   *Acting Commissioner of Patents and Trademarks*